United States Patent
Kim et al.

(10) Patent No.: US 12,551,804 B2
(45) Date of Patent: Feb. 17, 2026

(54) METHOD FOR PROVIDING INTERACTIVE GAME

(71) Applicant: KAKAO CORP., Jeju-si (KR)

(72) Inventors: Nam Sik Kim, Seoul (KR); Woo Ram Park, Seongnam-si (KR); Gui Un Oh, Seoul (KR)

(73) Assignee: Kakao Corp., Jeju-do (KR)

( * ) Notice: Subject to any disclaimer, the term of this patent is extended or adjusted under 35 U.S.C. 154(b) by 279 days.

(21) Appl. No.: 18/343,613

(22) Filed: Jun. 28, 2023

(65) Prior Publication Data

US 2023/0338862 A1 Oct. 26, 2023

Related U.S. Application Data

(63) Continuation of application No. PCT/KR2021/020148, filed on Dec. 29, 2021.

(30) Foreign Application Priority Data

Jan. 4, 2021 (KR) .................. 10-2021-0000483

(51) Int. Cl.
- *A63F 13/87* (2014.01)
- *A63F 13/60* (2014.01)
- *A63F 13/795* (2014.01)

(52) U.S. Cl.
CPC .............. *A63F 13/87* (2014.09); *A63F 13/60* (2014.09); *A63F 13/795* (2014.09)

(58) Field of Classification Search
None
See application file for complete search history.

(56) References Cited

U.S. PATENT DOCUMENTS

| 8,762,860 B2 * | 6/2014 | Shochet | G06Q 10/107 |
| | | | 715/755 |
| 9,443,271 B2 * | 9/2016 | Tucker | G06Q 50/01 |
| (Continued) | | | |

FOREIGN PATENT DOCUMENTS

| KR | 20050108243 A | 11/2005 |
| KR | 20050120389 A | 12/2005 |
| (Continued) | | |

OTHER PUBLICATIONS

Office Action from Application No. 10-2021-0000483, dated Aug. 19, 2022.

(Continued)

*Primary Examiner* — Seng H Lim

(74) *Attorney, Agent, or Firm* — Knobbe, Martens, Olson & Bear, LLP

(57) ABSTRACT

A method for providing an interactive game through a processor of a computing device is proposed. The method may include outputting a first message generated through a character account corresponding to a character of an interactive game application on a chatting application. The method may also include when a second message is acquired in response to the first message from a user account corresponding to a user playing the interactive game on the chatting application, performing a reaction determined on the basis of the second message. The character account may be created on the chatting application when the user signs up for the interactive game.

10 Claims, 13 Drawing Sheets

(56) References Cited

U.S. PATENT DOCUMENTS

| | | | | |
|---|---|---|---|---|
| 9,986,391 | B2* | 5/2018 | Cho | G06Q 10/00 |
| 10,116,598 | B2* | 10/2018 | Tucker | H04L 51/10 |
| 10,778,623 | B1* | 9/2020 | Wu | A63F 13/48 |
| 10,786,744 | B1* | 9/2020 | George | A63F 13/35 |
| 11,171,989 | B1* | 11/2021 | Kim | H04L 63/108 |
| 11,617,957 | B2* | 4/2023 | Srikrishnan | A63F 9/183 |
| | | | | 463/9 |
| 2011/0202605 | A1* | 8/2011 | Shochet | H04L 51/04 |
| | | | | 709/205 |
| 2012/0054646 | A1* | 3/2012 | Hoomani | H04L 51/04 |
| | | | | 715/758 |
| 2013/0316834 | A1* | 11/2013 | Vogel | G06F 17/40 |
| | | | | 463/42 |
| 2016/0241498 | A1* | 8/2016 | Senjo | H04L 51/046 |
| 2016/0359777 | A1* | 12/2016 | Tucker | H04L 51/04 |
| 2017/0100676 | A1* | 4/2017 | Lynch | A63F 13/79 |
| 2017/0180299 | A1* | 6/2017 | Garza | H04L 51/52 |
| 2017/0243387 | A1* | 8/2017 | Li | G06V 20/46 |
| 2017/0357417 | A1* | 12/2017 | Goossens | G06F 3/04883 |
| 2018/0077543 | A1* | 3/2018 | Cho | G06Q 30/02 |
| 2018/0315499 | A1* | 11/2018 | Appelbaum | G16H 20/60 |
| 2018/0331990 | A1* | 11/2018 | Bastide | H04L 51/046 |
| 2019/0387031 | A1* | 12/2019 | Steinbach | H04L 65/1066 |
| 2020/0137001 | A1* | 4/2020 | Wu | G06F 40/35 |
| 2020/0225832 | A1* | 7/2020 | Niki | G06Q 10/10 |
| 2021/0176197 | A1* | 6/2021 | Al Majid | G06T 13/20 |
| 2021/0312684 | A1* | 10/2021 | Zimmermann | A63F 13/5255 |
| 2021/0374357 | A1* | 12/2021 | Holmdahl | A63F 13/87 |
| 2022/0008828 | A1* | 1/2022 | Srikrishnan | A63F 13/45 |
| 2023/0107184 | A1* | 4/2023 | Han | G06F 40/106 |
| | | | | 345/633 |
| 2023/0338862 | A1* | 10/2023 | Kim | A63F 13/35 |

FOREIGN PATENT DOCUMENTS

| | | |
|---|---|---|
| KR | 20060029494 A | 4/2006 |
| KR | 20090014610 A | 2/2009 |
| KR | 101744071 B1 | 6/2017 |
| KR | 20180022493 A | 3/2018 |
| KR | 20180030767 A | 3/2018 |
| KR | 20190100428 A | 8/2019 |
| KR | 20200025999 A | 3/2020 |

OTHER PUBLICATIONS

International Search Report, dated Apr. 20, 2022, from PCT/KR2021/020148.
A Study on the Effect of Chatbot's Response Delay Depending on Conversational Context, Graduate School of Engineering of Yonsei University, Ahra Lee, Jun. 2019.
Has anyone played this game . . . ? vs SimSimi <Review>, https://www.inven.co.kr/board/webzine/1288/16050, May 25, 2017.

* cited by examiner

METHOD FOR PROVIDING INTERACTIVE GAME

CROSS REFERENCE TO RELATED APPLICATIONS

This is a continuation application of International Patent Application No. PCT/KR2021/020148, filed on Dec. 29, 2021, which claims priority to Korean Patent Application No. 10-2021-0000483 filed on Jan. 4, 2021, contents of both of which are incorporated herein by reference in their entireties.

BACKGROUND

Technical Field

The present disclosure relates to a method of providing an interactive game, and more particularly, to a method of linking an interactive game application and a chatting application.

Description of Related Technology

With the development of the internet, media content services related to games and chatting based on the internet are growing.

In particular, with the increasing popularity of webtoon service as one of the online media content services, various webtoon-related services are provided. For example, as the webtoon-related services, interactive games in which users create stories based on webtoons are drawing attention.

SUMMARY

One aspect is an interactive game able to be linked to a chatting application.

Another aspect is a method for providing an interactive game through a processor of a computing device is disclosed. The method includes: outputting a first message generated through a character account corresponding to a character of an interactive game application on a chatting application; and when a second message is acquired in response to the first message from a user account corresponding to a user playing the interactive game on the chatting application, performing a reaction determined on the basis of the second message, and the character account is created on the chatting application when the user signs up for the interactive game.

Further, the character account may be added to a friend list of the user account in the chatting application when an event related to the character occurs in the game application.

Further, the second message may be output on the chatting application, along with information indicating whether the character has seen the second message, and the reaction may include at least one of the following: a first reaction of outputting a response message to the second message; a second reaction expressing that the character has not seen the second message, without outputting a response message; or a third reaction expressing that the character has seen the second message, without outputting a response message.

Further, when the first reaction is performed, the response message may be output after an elapse of a preset time from a time when the second message is acquired or a time when the second message is displayed as having been read.

Further, the preset time may be a time determined on the basis of a number of texts constituting the response message.

Further, the first message may be a message generated based on first log data generated in the interactive game application until the interactive game application is terminated, in a case where the chatting application is executed after the interactive game application is terminated.

Further, the first message may include a specific dialogue set corresponding to a specific condition when the specific condition among a plurality of preset conditions is satisfied.

Further, the first message may be a message generated through an interactive game application running on a background when the chatting application is running.

Further, the first message may be a message generated and received by an external server related to the interactive game application.

Further, the reaction may be a reaction determined on the basis of whether at least one of a first keyword having a positive meaning or a second keyword having a negative meaning is included in the second message.

Further, the method may further include: outputting on the interactive game application a message generated at least one of the first message, the second message, or the reaction, in a case where the chatting application is terminated and the interactive game application is executed.

Another aspect is a computer program stored in a computer readable storage medium is disclosed. The computer program includes instructions for controlling a processor of a computing device providing an interactive game to perform the following operations: outputting a first message generated through a character account corresponding to a character of an interactive game application on a chatting application; and when a second message is acquired in response to the first message from a user account corresponding to a user playing the interactive game on the chatting application, performing a reaction determined on the basis of the second message, wherein the character account is created on the chatting application when the user signs up for the interactive game.

The technical solutions achievable in the present disclosure are not limited to the aforementioned solutions, and other solutions not mentioned will become clear to those skilled in the art from the description below.

The present disclosure provides an interactive game able to be linked to a chatting application, thereby improving entertainment elements for an interactive game user.

Effects achievable by the present disclosure are not limited to the above-described effects, and other effects which are not described herein may be clearly understood by those skilled in the pertinent art from the following description.

BRIEF DESCRIPTION OF THE DRAWINGS

Various aspects are described with reference to the drawings, and herein, like reference numerals are generally used to designate like constituent elements. In the following embodiments, for the purpose of description, a plurality of specific and detailed matters are suggested in order to provide general understanding of one or more aspects. However, it is apparent that the aspect(s) may be carried out without the specific and detailed matters.

DETAILED DESCRIPTION

Figure 1:
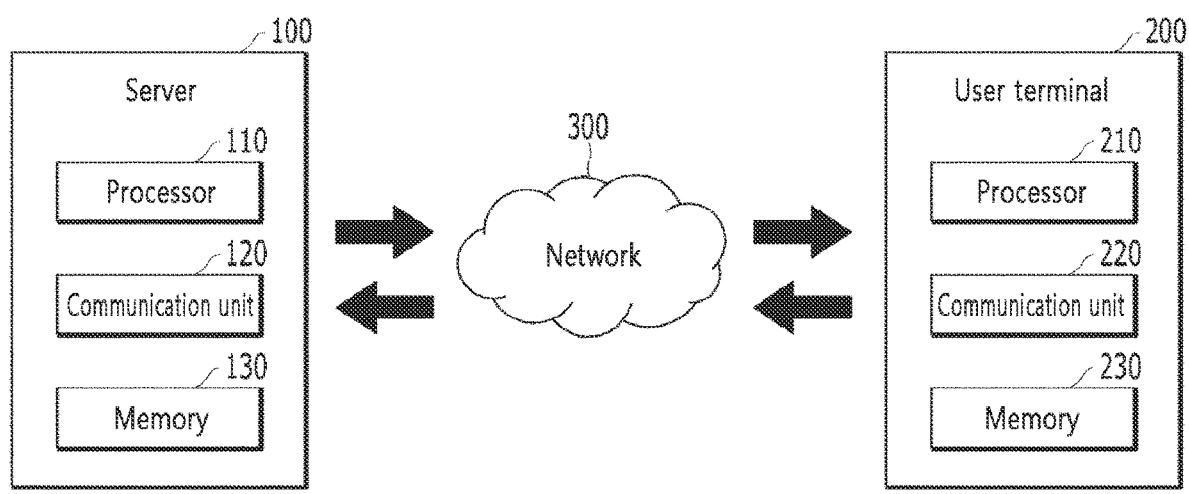
FIG. 1 is a diagram for explaining an example of an interactive game service based on a server and a user terminal in which various aspects of the present disclosure may be implemented.

A webtoon-based interactive game is a game that features characters appearing on a game screen, similar to a webtoon, and involves conversations between the characters and a user. For example, the character may ask the user a question. Then, the user selects an answer to the question to determine the next story of the interactive game.

Since such an interactive game includes various storylines that can be developed based on the user's choices, the interactive game require a vast amount of game screens. However, game developers creating interactive games are faced with the task of creating individual screens for various storylines. Therefore, there may be a demand for a method for more conveniently creating a game screen in the art.

Additionally, the interactive games aim to provide a customized conversation feature to increase users' interest. However, game developers have limitations in providing customized conversation features for each individual user in the interactive games. Accordingly, in the art, there may a demand for a method for providing a customized conversation feature in an interactive game.

Also, Korean Patent Application Publication No. 10-2009-0014610 has been proposed in this regard.

Various embodiments and/or aspects now will be described with reference to the drawings. Hereinafter, for description, a plurality of details will be described for comprehensive understanding of one or more aspects. However, it should be appreciated by one of ordinary skill in the art that the aspect(s) described herein may be executed without the details. Particularly exemplary ones of the one or more aspects will be described in detail through the following description and the attached drawings. However, these aspects are merely examples, some of various methods in principles of various aspects may be used, and explanations that will be described are intended to include all the aspects and equivalents thereof. Specifically, in "embodiment", "example", "aspect", "illustration", and the like used in the specification, it may not be construed that a predetermined aspect or design which is described is more excellent or advantageous than other aspects or designs.

In addition, various aspects and features will be presented by a system which can include one or more apparatuses, terminals, servers, devices, components, and/or modules. It should also be appreciated and recognized that various systems can include additional apparatuses, terminals, servers, devices, components, and/or modules and/or that the various systems cannot include all of apparatuses, terminals, servers, devices, components, modules, and the like discussed in association with the drawings.

"Computer program", "component", "module", "system", and the like which are terms used in this specification may be used to be compatible with each other and refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers.

Also, these components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

Hereinafter, the same reference numerals are given to the same or similar components regardless of reference numerals, and overlapping descriptions thereof will be omitted. In addition, in describing the embodiments disclosed in this specification, the detailed description of known arts can obscure the embodiments of the disclosure, a detailed description of known arts will be omitted. In addition, the accompanying drawings are used to help easily understand embodiments presented in this specification, and it should be understood that embodiments presented herein are not limited by the accompanying drawings.

Terminology used herein is for describing the embodiments and is not intended to limit the present disclosure. In this specification, a singular expression includes a plural expression unless the context clearly indicates otherwise. "Comprises" and/or "comprising" used herein do not preclude the existence or the possibility of adding one or more elements other than those mentioned.

It will be understood that, although the terms first, second, etc. may be used herein to describe various elements, these elements should not be limited by these terms. These terms are only used to distinguish one device from another device. Thus, a first device or element discussed below could be termed a second device or element without departing from the teachings of the present inventive.

Unless otherwise defined, all terms (including technical and scientific terms) used in the present specification may be used as meanings that can be commonly understood by those of ordinary skill in the art to which the present disclosure belongs. In addition, the terms defined in a commonly used dictionary are not interpreted ideally or excessively unless defined explicitly and specifically.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to all of the case where X uses A, the case where X uses B, or the case where X uses both A and B. Further, it should be understood that the term "and/or" used in the specification designates and includes all available combinations of one or more items among enumerated related items.

In addition, the terms "information" and "data" used herein may often be used interchangeably with each other.

The suffixes "module" and "unit" for components used in the description below are assigned or mixed in consideration of easiness in writing the specification and do not have distinctive meanings or roles by themselves.

An object and an effect of the present disclosure, and technical configurations for achieving them will be apparent when the exemplary embodiments, which are described below in detail together with the accompanying drawing, are referred. In the description of the present disclosure, when a detailed description of a related publicly known function or configuration is determined to unnecessarily make the subject matter of the present disclosure unclear, the detailed description will be omitted Further, terms described below are terms set in consideration of a function in the present disclosure, and may be changed according to an intension of a user and an operator or a usual practice.

However, the present disclosure is not limited to the embodiments disclosed below and may be implemented in various different forms. The present exemplary embodiments are provided to make the present disclosure complete and to completely transfer the scope of the disclosure to those skilled in the art, and the present disclosure is simply defined by the claims. Accordingly, the definitions thereof should be made based on the entire contents of the present specification.

The scope of the operations in the claims of the present disclosure arises from the functions and features described in respective steps, and is not affected by the order in which respective steps in the claims are disclosed if a sequence relationship of the disclosed order in respective steps constituting the method is not specified. For example, in the claims set forth in the step including steps A and B, the scope of rights is not limited to the fact that step A precedes step B, even if step A is described before step B.

FIG. 1 is a diagram for explaining an example of an interactive game service based on a server and a user terminal in which various aspects of the present disclosure may be implemented.

Referring to FIG. 1, a server 100 according to some embodiments of the present disclosure may provide an interactive game service to a user terminal 200. Specifically, the server 100 may provide a dialogue set in an interactive game service provided to the user terminal 200. That is, the server 100 according to some embodiments of the present disclosure may be a game server for providing games. However, the present disclosure is not limited thereto.

The server 100 may include any type of computer system or computer device, such as, for example, a microprocessor, a mainframe computer, a digital processor, a portable device, a device controllers, and the like. However, the present disclosure is not limited thereto.

According to some embodiments of the present disclosure, the server 100 may include a processor 110, a communication unit 120, and a memory 130. However, the aforementioned components are not essential to implement the server 100, and the server 100 may have more or fewer components than those listed above. Here, each component may be configured as a separate chip, module, or device, or may be included in one device.

The processor 110 of the server 100 may generally control the overall operations of the server 100. The processor 110 may process signals, data, information, and the like input or output through the components of the server 100 or may drive an application program stored in the memory 130 to provide or process appropriate information or functions to a user.

In addition, the processor 110 may control at least some of the components of the server 100 in order to drive an application program stored in the memory 130. Furthermore, the processor 110 may operate at least two or more components, included in the server 100, in combination to drive the application program.

Additionally, the processor 110 may perform calculation for learning of a neural network. The processor 110 may perform a calculation, such as processing of input data for learning in deep learning (DN), extraction of a feature from input data, an error calculation, updating of a weight of a neural network by using backpropagation, for learning of a neural network.

In addition, at least one of the CPU, GPGPU, and the TPU of the processor 110 may process learning of a network function. For example, the CPU and the GPGPU may process learning of a network function and data classification by using the network function together.

Further, in the exemplary embodiment of the present disclosure, learning of a network function and data classification by using the network function may be processed by using processors of the plurality of computing devices together. Further, the computer program executed in the computing device according to the exemplary embodiment of the present disclosure may be a CPU, GPGPU, or TPU executable program.

The communication unit 120 of the server 100 may include one or more modules enabling communication between the server 100 and the user terminal 200 or between the server 100 and an external server. Also, the communication unit 120 may include one or more modules that connect the server 100 to one or more networks.

The memory 130 of the server 100 stores data that supports various functions of the server 100. The memory 130 may store a plurality of application programs (application programs or applications) running on the server 100, and data and instructions for operation of the server 100. Some of these application programs may be downloaded from an external server via wireless communication. In addition, at least some of these application programs may be installed in the server 100 at a time of shipment for default functions of the server 100. Meanwhile, the application program may be stored in the memory 130, installed in the server 100, and driven by the processor 110 to perform an operation (or function) of the server 100.

According to some embodiments of the present disclosure, the processor 110 of the server 100 may automatically arrange a speech bubble of a user interface (i.e., game screen) related to an interactive game by using various tables stored in the memory 130.

Specifically, the processor 110 of the server 100 may determine a position, a shape, and a size of the speech bubble by using the various tables.

Accordingly, the server 100 of the present disclosure may improve productivity of the user interface related to the interactive game.

Additionally, the processor 110 of the server 100 may generate a user-customized dialogue set by using a plurality of conditions stored in the memory 130 and log data of the interactive game.

Specifically, the processor 110 of the server 100 may generate a user-customized dialog related to the log data by using the plurality of conditions and the log data generated upon previous execution of the interactive game application in the user terminal 200.

Therefore, the server 100 of the present disclosure may increase entertainment elements for the user.

However, the present disclosure is not limited to the above example, and the user terminal 200 may automatically arrange a speech bubble of a user interface (i.e., a game screen) related to an interactive game. Also, the user terminal 200 may generate a user-customized dialogue set by using a plurality of conditions and log data of the interactive game.

That is, it will be appreciated by a person with general knowledge in the technical field to which the present disclosure pertains that the entity performing the technical features of the present disclosure (such as automatically arranging a speech bubble, generating a user-customized dialog set, etc.) is not limited to a single device.

In the following description, for convenience of description, a method for performing the technical features of the present disclosure and embodiments thereof will be described from the perspective of the server 100. However, the entity performing the technical features of the present disclosure may be the server 100 or the user terminal 200, and is not limited to any one device.

Hereinafter, a description of how the server 100 generates a user interface related to an interactive game and a method of generating a dialog set will be described later with reference to FIGS. 2 to 12.

The user terminal 200 according to some embodiments of the present disclosure may receive an interactive game service provided by the server 100. That is, the user terminal 200 according to some embodiments of the present disclosure may be a user terminal for playing a game.

The user terminal 200 includes, for example, a mobile phone, a smart phone, a laptop computer, a personal digital assistant (PDA), a slate PC, a tablet PC, and an ultrabook. However, the present disclosure is not limited thereto.

According to some embodiments of the present disclosure, the user terminal 200 may include a processor 210, a communication unit 220, and a memory 230. However, the aforementioned components are not essential to implement the user terminal 200, so the user terminal 200 may have more or fewer components than the components listed above. Here, each component may be configured as a separate chip, module, or device, or may be included in one device.

The processor 210 of the user terminal 200 may generally control the overall operations of the user terminal 200. The processor 210 may provide or process appropriate information or functions to the user by processing signals, data, information, and the like input or output through the components of the user terminal 200 or by driving an application program stored in the memory 230.

In addition, the processor 210 may control at least some of the components of the user terminal 200 in order to drive an application program stored in the memory 230. Furthermore, the processor 210 may operate at least two or more of the components, included in the user terminal 200, in combination to drive the application program.

The communication unit 220 of the user terminal 200 may include one or more modules that enable communication between the user terminal 200 and the server 100. Also, the communication unit 220 may include one or more modules that connect the user terminal 200 to one or more networks.

The memory 230 of the user terminal 200 stores data that supports various functions of the user terminal 200. The memory 230 may store a plurality of application programs (application programs or applications) running on the user terminal 200, and data and instructions for operation of the user terminal 200. Some of these application programs may be downloaded from an external server through wireless communication. In addition, at least some of these application programs may be installed in the user terminal 200 at a time of shipment for default functions of the user terminal 200. Meanwhile, the application program may be stored in the memory 230, installed in the user terminal 200, and driven by the processor 210 to perform an operation (or function) of the user terminal 200.

According to some embodiments of the present disclosure, the processor 210 of the user terminal 200 may store an interactive game application provided by the server 100 in the memory 230. Also, in order to receive a customized dialog set in an interactive game, the processor 210 may control the communication unit 220 to transmit log data of the interactive game application to the server 100.

The network 300 according to the embodiments of the present disclosure may be configured regardless of a type of communication such as wired communication or wireless communication, and may include various communication networks such as a Public Switched Telephone Network (PSTN), an x Digital Subscriber Linex (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a Local Area Network (LAN). In addition, the network 300 may be the known World Wide Web (WWW) and may use wireless transmission techniques used for short-range communication such as Infrared Data Association (IrDA) or Bluetooth. In addition, the network 300 presented here may use various wireless communication systems such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA) and other systems.

The techniques described herein may be used in the aforementioned networks as well as other networks.

Various embodiments described herein may be implemented in a computer-readable recording medium or a recording medium and a storage medium readable by a device similar to the computer by using, for example, software, hardware, or a combination thereof.

According to hardware implementation, the embodiment described herein may be implemented by using at least one of the application specific integrated circuits (ASICs), the digital signal processors (DSPs), the digital signal processing devices (DSPDs), the programmable logic devices (PLDs), the field programmable gate arrays (FPGAs), the processors, the controllers, the micro-controllers, the microprocessors, and the electric units for performing other functions. In some cases, the embodiments described in the specification may be implemented by the processors included in the server 100 and the user terminal 200.

According to software implementation, embodiments such as a procedure and a function described in the specification may be implemented by separate software modules. Each of the software modules may perform one or more functions and operations described in the specification. A software code may be implemented by a software application written by an appropriate program language. The software code may be stored in the memory of each of the server 100 and the user terminal 200, and executed by a processor of each of the server 100 and the user terminal 200.

Figure 2:
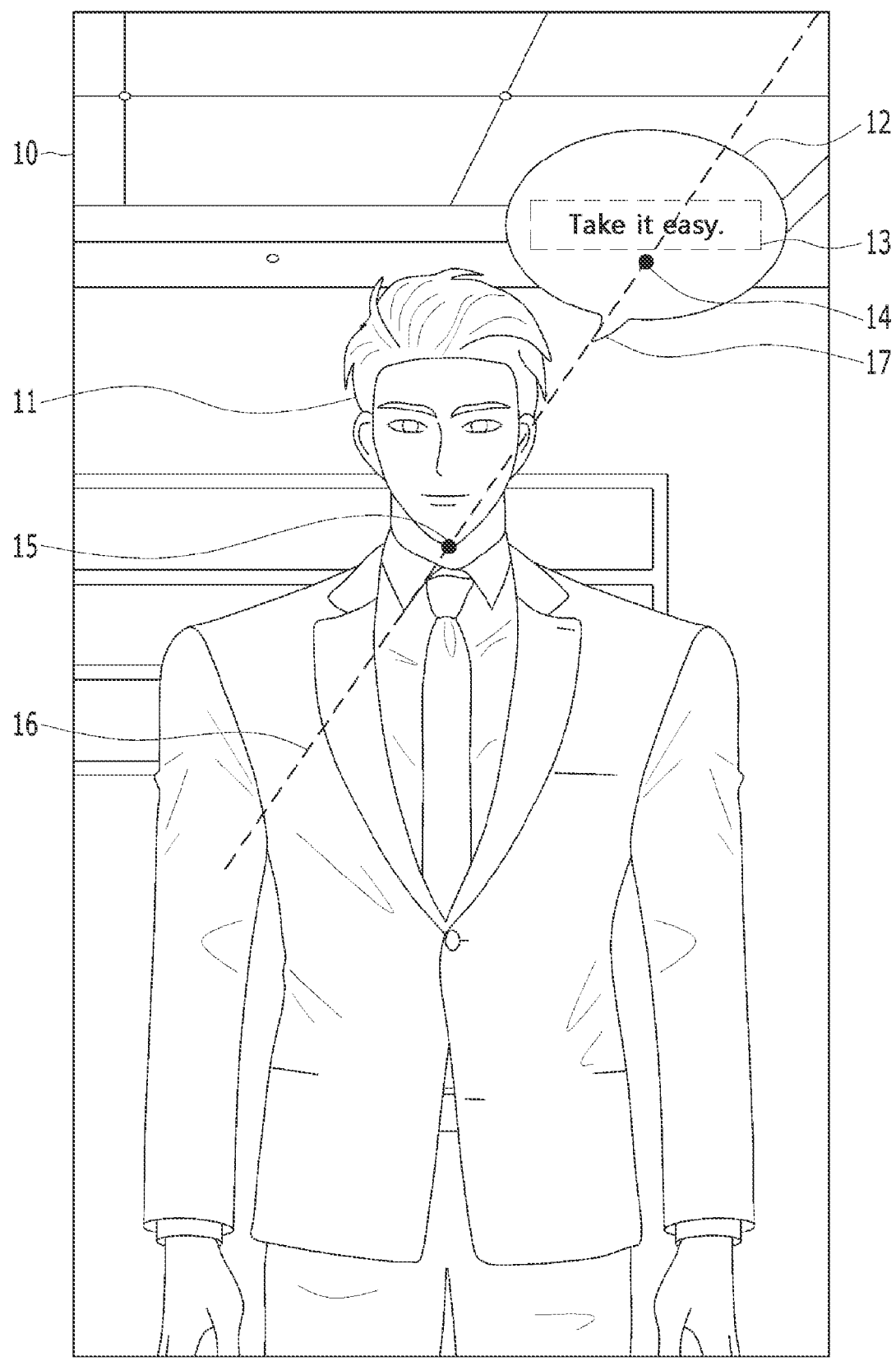
FIG. 2 is a diagram for explaining an example of a user interface related to an interactive game according to some embodiments of the present disclosure.

FIG. 2 is a diagram for explaining an example of a user interface related to an interactive game according to some embodiments of the present disclosure.

Referring to FIG. 2, an example of a user interface screen 10 related to an interactive game according to some embodiments of the present disclosure is illustrated. The user interface screen 10 may include a character image 11, a plurality of first texts 13 related to a first dialogue line of the character image 11, and a first speech bubble 12. However, the aforementioned components are not essential to construct the user interface screen 10, so the user interface screen 10 may have more or fewer components than the components listed above.

Here, the first speech bubble 12 included in the user interface screen 10 may include the plurality of first texts 13. Also, the first speech bubble 12 may have a shape determined on the basis of a type of the first dialogue line. Also, a position where to display the first speech bubble 12 may be determined according to the type of the first dialogue line. Also, a size of the first speech bubble 12 may be determined according to the number of the plurality of first texts 13. Here, the type of the first dialogue line may refer to how the character image expresses the first dialogue line, such as general conversation, phone conversation, inner thought, and shouting. However, the present disclosure is not limited thereto.

That is, the processor 110 of the server 100 may recognize the type of the first dialogue line when acquiring the first dialogue line of the character image 11. In addition, based on the type of the first dialogue line, the processor 110 may determine the shape of the first speech bubble 12 where the first dialogue line is to be displayed. For example, the processor 110 may determine the shape of the first speech bubble 12 by using the type of the first dialogue line and a speech bubble shape table pre-stored in the memory 130. However, the present disclosure is not limited thereto, and the processor 210 of the user terminal 200 may recognize the type of the first dialogue line when acquiring the first dialogue line of the character image 11. Also, based on the type of the first dialogue line, the processor 210 may determine the shape of the first speech bubble 12 where the first dialogue line is to be display. For example, the processor 210 may determine the shape of the first speech bubble 12 by using the type of the first dialogue line and a speech bubble shape table pre-stored in the memory 230.

That is, the interface screen referred to in this specification may be determined by a processor of at least one of the server 100 or the user terminal 200.

Hereinafter, a method in which the processor 110 of the server 100 determines the shape of the first speech bubble 12 based on the type of the first dialogue line will be described later with reference to FIG. 3.

Meanwhile, based on the type of the first dialogue line, the processor 110 may determine a position where to display the first speech bubble 12. For example, by using the type of the first dialogue line and a speech bubble position table pre-stored in the memory 130, the processor 110 may determine the position where to display the first speech bubble 12. However, the present disclosure is not limited thereto.

Hereinafter, a method in which the processor 110 of the server 100 determines a position where to display the first speech bubble 12 based on a type of a first dialogue line will be described later with reference to FIG. 4.

Meanwhile, the processor 110 may determine a size of the first speech bubble 12 based on the number of the plurality of first texts 13 related to the first dialogue line. For example, the processor 110 may determine the size of the first speech bubble 12 by using the number of the first texts and a speech bubble size table pre-stored in the memory 130. However, the present disclosure is not limited thereto.

Hereinafter, a method in which the processor 110 of the server 100 determines a size of the first speech bubble 12 based on the number of the plurality of first texts 13 will be described later with reference to FIG. 3.

As described above, the processor 110 of the server 100 according to some embodiments of the present disclosure may determine a shape, a position and a size of a speech bubble included in the user interface screen 10, by using the type of the first dialogue line or the plurality of first texts associated with the type of the first dialogue line.

Accordingly, the server 100 of the present disclosure may provide convenience in creating a user interface related to an interactive game. In addition, the server 100 may improve productivity of interactive game contents by providing convenience in creating a user interface.

According to some additional embodiments of the present disclosure, the first speech bubble 12 of the user interface screen 10 may include a speech bubble notch 17. Specifically, the first speech bubble 12 may include the speech bubble notch 17 according to the type of the first dialogue line.

More specifically, when the type of the first dialogue line is a first type having a speech bubble notch, the first speech bubble 12 may be provided with the speech bubble notch 17 on a virtual line 16 that connects a first central point 15 of the character image 11 and a second central point 14 of the first speech bubble 12. Here, the first central point 15 is a central point of the character image 11, and may be located at the center of the character image 11. For example, the first central point 15 may be a point where all four corners of four rectangular regions meet in a state in which the character image 11 is divided into the four rectangular regions of the same size. In addition, the second central point 14 is a central point of the first speech bubble 12 and may be located at the center of the first speech bubble 12. However, the present disclosure is not limited thereto.

For example, the first speech bubble 12 may include the speech bubble notch 17 when the first dialogue line is a dialogue line expressing what the character image 11 speaks. However, the present disclosure is not limited thereto.

That is, the processor 110 of the server 100 may recognize the type of the first dialogue line when acquiring the first dialogue line of the character image 11. In addition, based on the type of the first dialogue line, the processor 110 may determine whether to display the speech bubble notch 17 at the first speech bubble 12. For example, when the processor 110 recognizes that the type of the first dialogue line is a first type related to speaking of the character image 11, the processor 110 may determines to display the speech bubble notch 17 at the first speech bubble 12.

Then, the processor 110 of the server 100 may recognize the first central point 15 of the character image 11. Also, the processor 110 may recognize the second central point 14 of the first speech bubble 12. In addition, the processor 110 may determine to display the speech bubble notch 17 on the virtual line 16 connecting the first central point 15 and the second central point 14.

In this case, the speech bubble notch 17 may be provided to face the character image 11 from the first speech bubble 12. Accordingly, the processor 110 of the present disclosure may generate an interface screen so that each of the character image 11, the first speech bubble 12, and the speech bubble notch 17 of the first speech bubble 12 is more naturally displayed in the interactive game.

Figure 3:
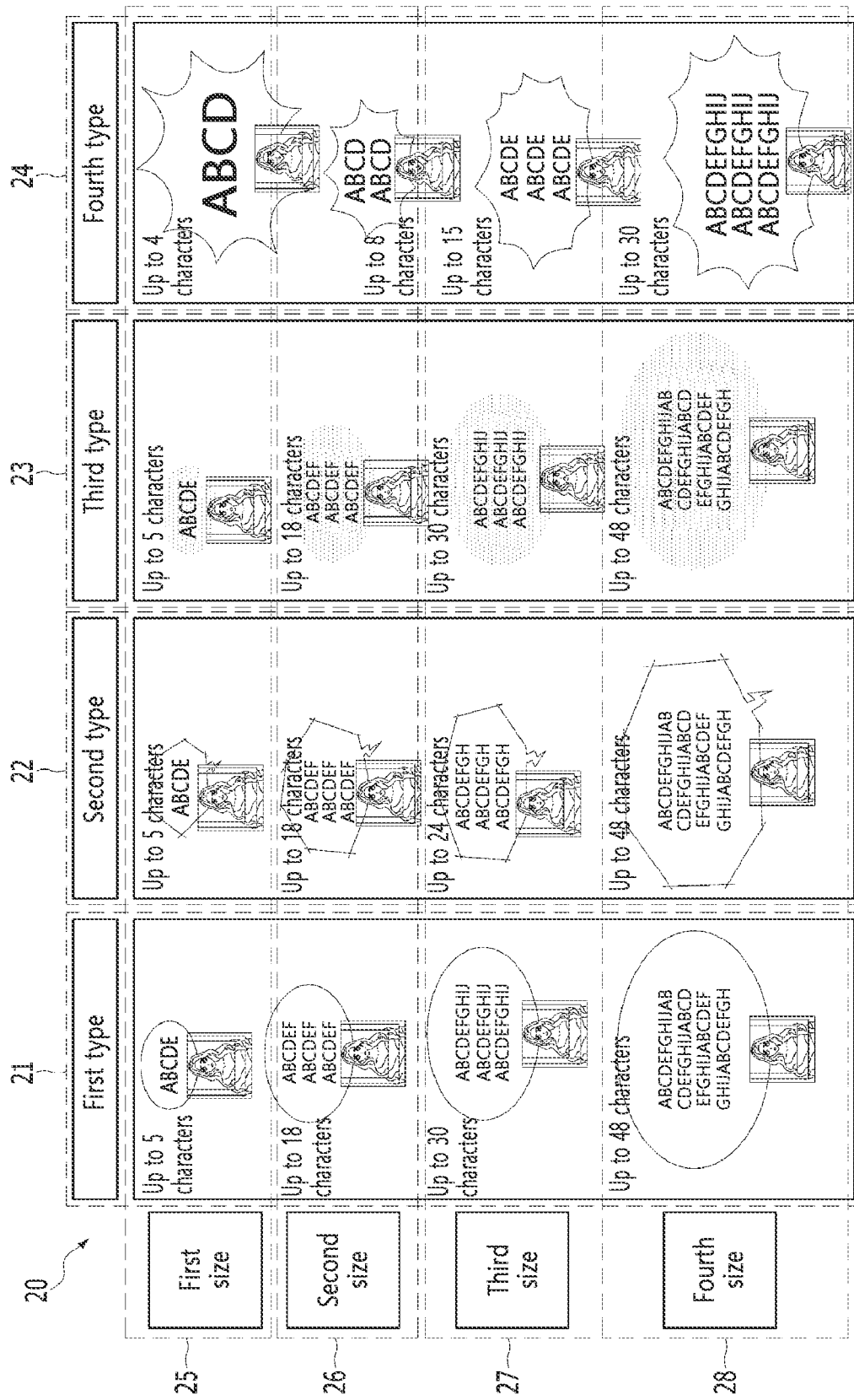
FIG. 3 is a diagram for explaining an example of a speech bubble shape table and a speech bubble size table according to some embodiments of the present disclosure.

FIG. 3 is a diagram for explaining an example of a speech bubble shape table and a speech bubble size table according to some embodiments of the present disclosure.

A table 20 shown in FIG. 3 may be a speech bubble shape table 20 and/or a speech bubble size table 20. That is, one table may include information on shapes of a plurality of speech bubbles and information on sizes of a plurality of speech bubbles. However, the present disclosure is not limited thereto, and the speech bubble shape table and the speech bubble size table may be separately provided.

According to some embodiments of the present disclosure, based on the speech bubble shape table 20 pre-stored in the memory 130, a shape of the first speech bubble 12 may be determined to be a specific shape mapped to the type of the first dialogue line.

Referring to FIG. 3, the speech bubble shape table 20 may include information on speech bubble shapes respectively mapped to a plurality of types.

For example, the speech bubble shape table 20 may include information on a first shape corresponding to a first type 21 related to general conversation. Here, the first shape may be an elliptical shape including a speech bubble notch, as illustrated. However, the present disclosure is not limited thereto.

In another example, the speech bubble shape table 20 may include information on a second shape corresponding to a second type 22 related to phone conversation. Here, the second shape may be a polygonal shape, as illustrated. However, the present disclosure is not limited thereto.

In yet another example, the speech bubble shape table 20 may include information on a third shape corresponding to a third type 23 related to inner thought. Here, the third shape may be an elliptical shape that does not include a speech bubble notch, as illustrated. In addition, the third shape speech bubble may have a different color from speech bubbles having other shapes. For example, speech bubbles having a first shape and a second shape may include a black text on a white background. Also, a speech bubble having a third shape may include a white text on a black background. However, the present disclosure is not limited thereto.

In yet another example, the speech bubble shape table 20 may include information on a fourth shape corresponding to a fourth type 24 related to shouting. Here, the fourth shape may be a polygonal shape with sharp vertices, as illustrated. However, the present disclosure is not limited thereto.

As described above in the description of FIG. 2, the processor 110 of the server 100 may recognize a type of the first dialogue line when acquiring the first dialogue line of the character image. In addition, the processor 110 may determine a speech bubble shape corresponding to the type of the first dialogue line using the speech bubble shape table 20 to generate an interactive game screen displayed on a user interface.

Accordingly, the server 100 of the present disclosure may allow content creators to save time in determining a shape of a speech bubble, thereby enhancing productivity in content creation.

According to some embodiments of the present disclosure, the size of the first speech bubble 12, the size of the first speech bubble 12 may be determined to be a specific size associated with the number of first texts based on the speech bubble size table 20 pre-stored in the memory 130.

As shown in FIG. 3, the speech bubble size table 20 may include information on speech bubble sizes respectively mapped to a plurality of text number ranges.

For example, the speech bubble size table 20 may include information on a first size corresponding to a first number range 25. Here, the first number range 25 may be 1 to 5. Also, the first size may be a smallest size among the speech bubble sizes. However, the present disclosure is not limited thereto.

In yet another example, the speech bubble size table 20 may include information on a second size corresponding to a second number range 26. Here, the second number range 26 may be 6 to 10. Also, the second size may be larger than the first size and smaller than a third size. However, the present disclosure is not limited thereto.

In yet another example, the speech bubble size table 20 may include information on a third size corresponding to a third number range 27. Here, the third number range 27 may be 11 to 30. Also, the third size may be larger than the second size and smaller than a fourth size. However, the present disclosure is not limited thereto.

In yet another example, the speech bubble size table 20 may include information on a fourth size corresponding to a fourth number range 28. Here, the fourth number range 28 may be 31 to 48. In addition, the fourth size may be a largest size. However, the present disclosure is not limited thereto.

As described above in the description of FIG. 2, the processor 110 of the server 100 may recognize the number of the plurality of first texts associated with the first dialogue line. In addition, the processor 110 may determine the size of the first speech bubble 12 by using the number of the first texts and the speech bubble size table 20 pre-stored in the memory 130.

Accordingly, the server 100 of the present disclosure may allow content creators to save time in determining a size of a speech bubble, thereby enhancing productivity of content production.

According to some additional embodiments of the present disclosure, the size of each of the plurality of first texts may be changed according to the number of the plurality of first texts.

Specifically, the size of each of the plurality of first texts may be determined by recognizing a specific size associated with the number of the plurality of first texts in a text size table (not shown) pre-stored in the memory 130. Here, the text size table may include information on text sizes respectively mapped to the plurality of text number ranges included in the table.

That is, the processor 110 of the server 100 may recognize the number of the plurality of first texts associated with the first dialogue line. The processor 110 may determine the sizes of the plurality of first texts by using the number of the first texts and the text size table pre-stored in the memory 130.

Accordingly, the server 100 of the present disclosure may allow content creators to save time in determining a size of a text, thereby enhancing productivity of content production.

Figure 4:
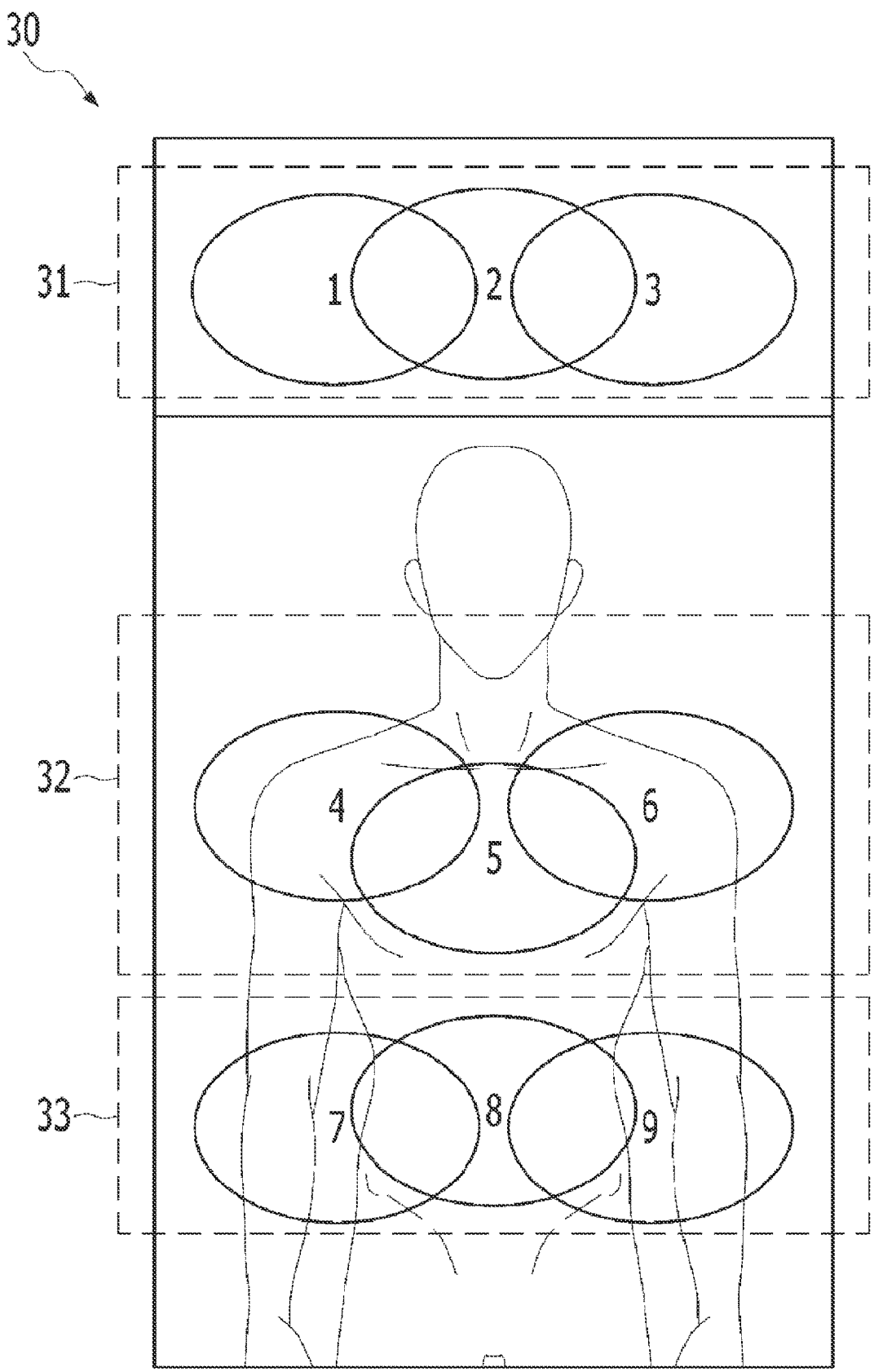
FIG. 4 is a diagram for explaining an example of a speech bubble position table according to some embodiments of the present disclosure.

FIG. 4 is a diagram for explaining an example of a speech bubble position table according to some embodiments of the present disclosure.

According to some embodiments of the present disclosure, a position where to display the first speech bubble 12 may be determined to be a specific position mapped to a type of the first dialogue line, based on the speech bubble position table 30 pre-stored in the memory 130.

Referring to FIG. 4, the speech bubble position table 30 may include information on speech bubbles positions respectively mapped to a plurality of types.

For example, the speech bubble position table 30 may include information 31 on a first position corresponding to a type associated with a dialogue line of a character image. Here, the first position may indicate an upper part of an interactive game screen displayed on a user interface. That is, the first position may be an area above a part where the face of the character image is displayed. However, the present disclosure is not limited thereto.

In another example, the speech bubble position table 30 may include information 32 on a second position corresponding to a type associated with an inner thought of the character image. Here, the second position may indicate a central area of the interactive game screen displayed on the user interface. That is, the second position may be the chest of the character image, as illustrated. However, the present disclosure is not limited thereto.

In yet another example, the speech bubble position table 30 may include information 33 on a third position corresponding to a non-dialogue type (e.g., narration, messenger, and phone talking) of the character image. Here, the third position may indicate a lower part of the interactive game screen displayed on the user interface. However, the present disclosure is not limited thereto.

As described above in the description of FIG. 2, the processor 110 of the server 100 may recognize a type of the first dialogue line. Also, the processor 110 may determine a position where to display the first speech bubble 12, by using the type of the first dialogue line and the speech bubble position table 30 pre-stored in the memory 130.

Accordingly, the server 100 of the present disclosure may allow content creators to save time in determining a position of a speech bubble, thereby enhancing productivity of content production.

According to some additional embodiments of the present disclosure, each of the information 31 on the first position, the information 32 on the second position, and the information 33 on the third position, which are included in the speech bubble position table 30, may further include detailed position information.

For example, the information 31 on a first position may include information on each of a first detailed position 1, a second detailed position 2, and a third detailed position 3. In this case, when a speech bubble is displayed at the first position, the speech bubble may be displayed at the first detailed position 1, the second detailed position 2, and the third detailed position 3, sequentially (in the order of 1, 2, and 3). However, the present disclosure is not limited thereto, and the first speech bubble may be displayed at any position among the first detailed position 1, the second detailed position 2, and the third detailed position 3.

In another example, the information 32 on the second position may include information on a fourth detailed position 4, a fifth detailed position 5, and a sixth detailed position 6. When a speech bubble is displayed at the second position, the second bubble may be displayed at the fourth detailed position 4, the fifth detailed position 5, and the sixth detailed position 6, sequentially (in the order of 4, 5, and 6). However, the present disclosure is not limited thereto, and the first speech bubble may be displayed at any position among the fourth detailed position 4, the fifth detailed position 5, and the sixth detailed position 6.

In yet another example, the information 33 on the third location may include information on a seventh detailed position 7, an eighth detailed position 8, and a ninth detailed position 9. When a speech bubble is displayed at the third position, the speech bubble may be displayed at the seventh detailed position 7, the eighth detailed position 8, and the ninth detailed position 9, sequentially (in the order of 7, 8, and 9). However, the present disclosure is not limited thereto, and the first speech bubble may be displayed at any position among the seventh detailed position 7, the eighth detailed position 8, and the ninth detailed position 9.

As described above, the position of the first speech bubble according to some embodiments of the present disclosure may be changed in detailed position, thereby preventing boredom for interactive game users.

Figure 5:
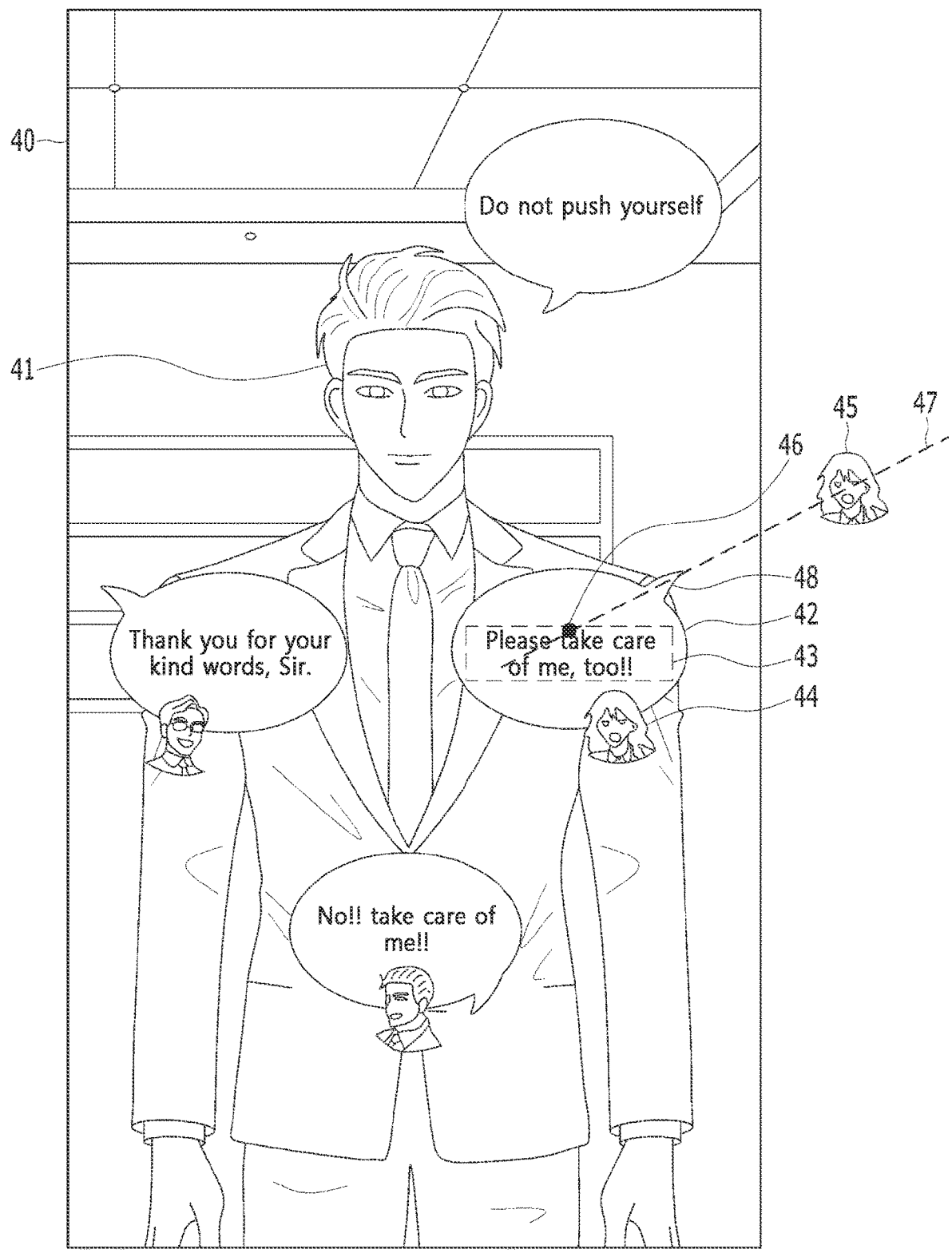
FIG. 5 is a diagram for explaining another example of a user interface related to an interactive game according to some embodiments of the present disclosure.
Figure 6:
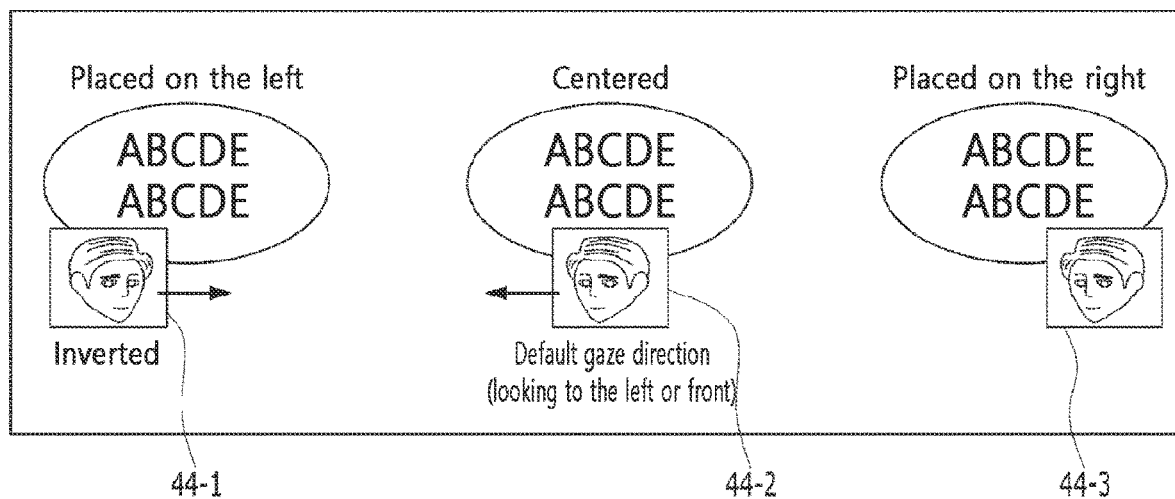
FIG. 6 is a diagram for explaining an example of a direction in which an emoticon of another character is facing according to some embodiments of the present disclosure.

FIG. 5 is a diagram for explaining another example of a user interface related to an interactive game according to some embodiments of the present disclosure. FIG. 6 is a diagram for explaining an example of a direction in which an emoticon of another character is facing according to some embodiments of the present disclosure.

Referring to FIG. 5, another example of a user interface screen 40 related to an interactive game according to some embodiments of the present disclosure is illustrated. The user interface screen 40 includes: a character image 41; a plurality of second texts 43 related to a second dialogue line of another character not related to the character image 41; a second speech bubble 42 including the plurality of second texts 43 and having a shape determined on the basis of a type of the second dialogue line; and an emoticon 44 of another character looking at the character image. However, the aforementioned components are not essential to construct the user interface screen 40, so the user interface screen 40 may have more or fewer components than the components listed above.

Here, a position where to display the second speech bubble 42 included in the user interface screen 40 may be determined on the basis of information on a virtual position 45 of another character. Also, the emoticons 44 of another character may be disposed on the second speech bubble 42. Also, the size of the second speech bubble 42 may be determined according to the number of the plurality of second texts 43.

That is, the processor 110 of the server 100 may determine the position where to display the second speech bubble 42, based on the information on the virtual position 45 of another character. Further, the processor 110 may determine a direction in which the emoticon 44 of another character disposed on the second speech bubble 42 is facing, based on the information on the virtual position 45 of another character.

For example, referring to FIG. 6, when the virtual position 45 of another character is present in a first direction (e.g., the left) of the character image 41, the second speech bubble 42 may be displayed in the first direction. Also, an emoticon 44-1 of another character may be formed to look in a direction (e.g., the right) opposite to the first direction. However, the present disclosure is not limited thereto, and the emoticon 44-1 of another character may be formed to look to the front or in a direction set as the default direction.

In another example, when the virtual position 45 of another character is present in a second direction (e.g., downward) of the character image 41, the second speech bubble 42 may be displayed in the second direction. Also, an emoticon 44-2 of another character may be formed to look in a direction (e.g., upward) opposite to the second direction. However, the present disclosure is not limited thereto, and the emoticon 44-2 of another character may be formed to look to the front or in a direction set as the default direction.

In another example, when the virtual position 45 of another character is present in a third direction (e.g., the right) of the character image 41, the second speech bubble 42 may be displayed in the third direction. Also, the emoticon 44-2 of another character may be formed to look in a direction (e.g., the left) opposite to the third direction. However, the present disclosure is not limited thereto, and the emoticon 44-3 of another character may be formed to look to the front or in a direction set as the default direction.

Accordingly, by using information on the virtual position 45 of another character, the processor 110 of the server 100 may determine the direction in which the emoticon 44 of another character is looking. In this case, a content creator may save time in determining a direction in which the emoticon 44 of another character is facing. Accordingly, productivity of content production may be improved.

In addition, based on the direction in which the emoticon of another character not present on the screen is facing, an interactive game user may be able to hint at the position of the corresponding character and perceive a dialogue line more intuitively.

Meanwhile, referring to FIG. 5 again, the processor 110 of the server 100 may recognize a type of a second dialogue line when acquiring the second dialogue line of another character. Also, based on the type of the second dialogue line, the processor 110 may determine a shape of the second speech bubble 42 where the first dialogue line is to be display. For example, the processor 110 may determine the shape of the second speech bubble 12 by using the type of the second dialogue line and a speech bubble shape table pre-stored in the memory 130. However, the present disclosure is not limited thereto.

Hereinafter, since a method in which the processor 110 of the server 100 determines a shape of a speech bubble based on a type of a dialogue line has been already described above with reference to FIG. 3, a detailed description of a method for determining a shape of the second speech bubble 42 based on a type of the second dialogue line will be omitted.

According to some additional embodiments of the present disclosure, the second speech bubble 42 of the user interface screen 40 may include a speech bubble notch 48. Specifically, the second speech bubble 42 may include a speech bubble notch 48 according to the type of the second dialogue.

More specifically, the second speech bubble 42 may be provided with the speech bubble notch 48 on a virtual line 47 that connects a specific point related to the virtual position 45 of another character and a third central point 46 of the second speech bubble 42.

That is, the processor 110 of the server 100 may recognize the specific point related to the virtual position 45 of another character. Also, the processor 110 may recognize the third central point 46 of the second speech bubble 42. Also, the processor 110 may determine to display the speech bubble notch 48 on the virtual line 47 that connects the specific point and the third central point 46.

In this case, the speech bubble notch 48 may be provided to face the virtual position of another character from the second speech bubble 42. Accordingly, the processor 110 of the present disclosure may cause an interactive game user to hint at a virtual position of another character not present on the screen, thereby enhancing entertainment elements of the interactive game.

Figure 7:
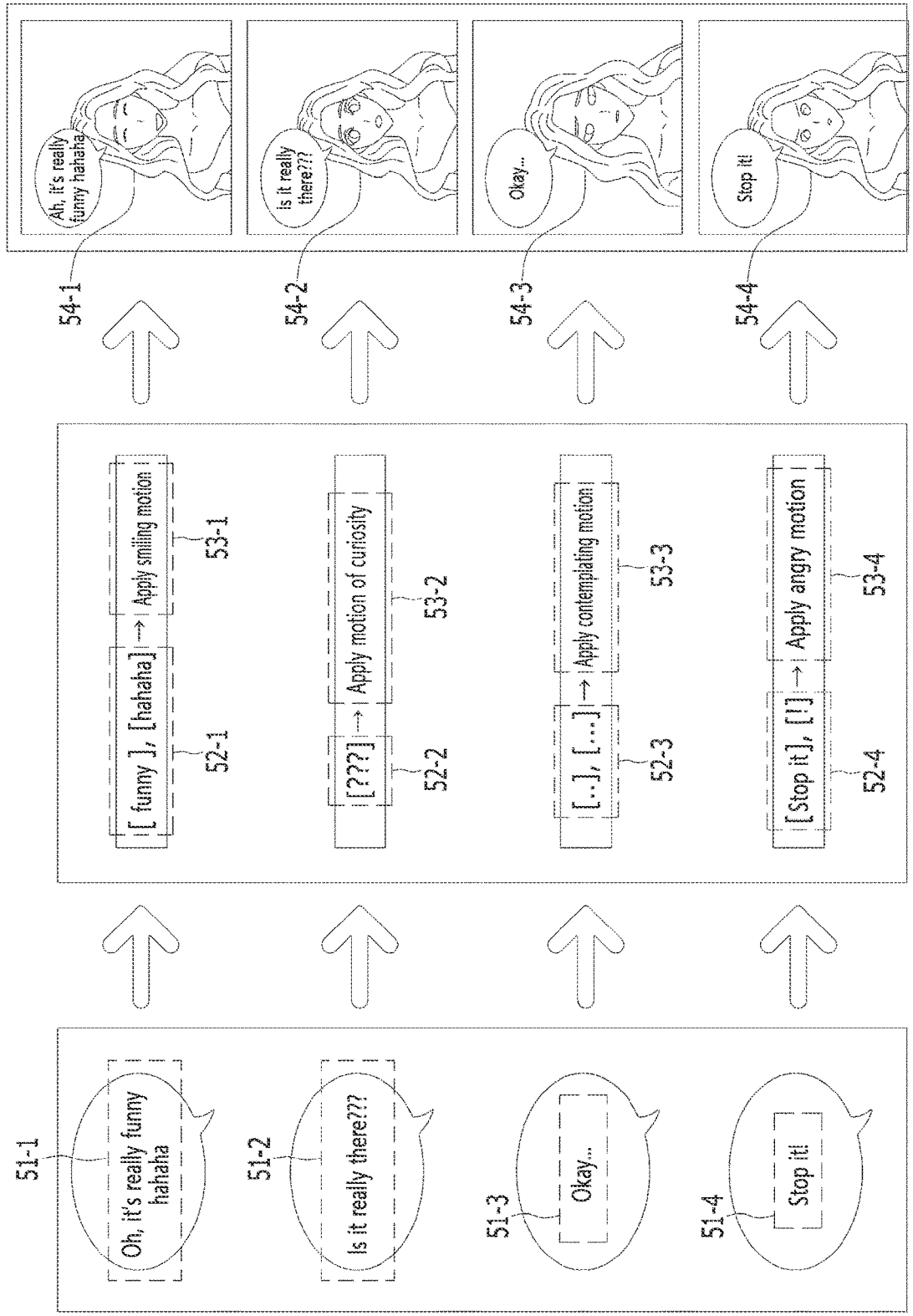
FIG. 7 is a diagram for explaining an example of a method for determining a motion of a character image according to some embodiments of the present disclosure.

FIG. 7 is a diagram for explaining an example of a method for determining a motion of a character image according to some embodiments of the present disclosure.

[According to some embodiments of the present disclosure, a character image included in a user interface screen may be a variable image. Specifically, the character image may change according to motion information of the character image, which is determined on the basis of a specific emotion related to a first dialogue line of the character image.

Here, the motion information may be information mapped to a specific emotion among information on character motions respectively mapped to multiple emotions in a motion table.

Specifically, the specific emotion may be determined on the basis of whether at least one specific keyword or specific punctuation mark is included in a plurality of first texts related to a first dialogue line.

More specifically, the specific emotion may be determined using the plurality of first texts and the emotion table pre-stored in the memory 130. Also, the emotion table may include information on emotions that are respectively mapped to a plurality of keywords and a plurality of punctuation marks. In this case, the specific emotion may be extracted by searching the emotion table for an emotion mapped to each of at least one keyword and at least one punctuation mark included in the plurality of first texts.

Meanwhile, when a plurality of emotions is extracted from the emotion table, the specific emotion may be determined to be the most frequently extracted emotion among the plurality of emotions.

Hereinafter, an example in which the specific emotion is determined will be described with reference to FIG. 7.

For example, referring to FIG. 7, when there is a plurality of first texts 51-1 of "Oh, it's really funny hahaha", the processor 110 of the server 100 may recognize a specific keyword 52-1 such as "funny" and "hahaha" included in the emotion table from among the plurality of first texts 51-1. Also, the processor 110 may search for the specific keyword 52-1 in the emotion table to extract a specific emotion. Then, the processor 110 may change the character image 54-1 by using motion information 53-1 (e.g., a smiling motion) mapped to the extracted specific emotion.

In another example, when there is a plurality of first texts 51-2 of "Is it really there???", the processor 110 of the server 100 may recognize a specific keyword 52-2 such as "???" included in the emotion table from among the plurality of first texts 51-2. Also, the processor 110 may search for the specific keyword 52-2 in the emotion table to extract a specific emotion. Then, the processor 110 may change the character image 54-2 by using motion information 53-2 (e.g., a motion of curiosity) mapped to the extracted specific emotion.

In yet another example, when there is the plurality of first texts 51-3 of ". . Okay . . . ", the processor 110 of the server 100 may recognize a specific keyword such as ". ." and " . . . " included in the emotion table from among the plurality of first texts 51-3. Also, the processor 110 may search for the specific keyword 52-3 in the emotion table to extract a specific emotion. Then, the processor 110 may change the character image 54-3 by using motion information 53-3 (e.g., a contemplating motion) mapped to the extracted specific emotion.

In yet another example, when there is a plurality of first texts 51-4 of "Stop it!", the processor 110 of the server 100 may recognize a specific keyword 52-4 such as "Stop it" and "!" included in the emotion table from among the plurality of first texts 51-4. Also, the processor 110 may search for the specific keyword 52-4 in the emotion table to extract a specific emotion. Then, the processor 110 may change the character image 54-4 by using motion information 53-4 (e.g., an angry motion) mapped to the extracted specific emotion.

Accordingly, the server 100 of the present disclosure may allow content creators to save time in determining a motion of a character image, thereby enhancing productivity of content creation.

According to some additional embodiments of the present disclosure, the processor 110 of the server 100 may input a first dialogue line to a pre-trained emotion analysis model, and recognize a specific emotion using result data output from the emotion analysis model.

Specifically, when a first dialogue line of a character image is acquired, the processor 110 may recognize a plurality of first texts associated with the first dialogue line. In addition, the processor 110 may input a plurality of first texts to the emotion analysis model to recognize a specific emotion corresponding to the plurality of first texts.

Here, the emotion analysis model may be trained using a training dataset that includes training text data generated by labelling training emotion data related to the first dialogue line to training text data related to the first dialogue line during a training process of the emotion analysis model. In addition, the emotion analysis model may be constructed using a deep neural network (DNN).

That is, the processor 110 of the server 100 may generate the training data by labeling training emotion data related to the first dialogue line to the training text data related to the first dialogue line. In addition, the processor 110 may generate the emotion analysis model by training the deep neural network (DNN) with the training data. In addition, the processor 110 may input the plurality of first texts into the emotion analysis model to acquire information on an emotion corresponding to the plurality of first texts. However, the present disclosure is not limited thereto.

The deep neural network may refer to a neural network that includes multiple hidden layers in addition to the input and output layers. By using the deep neural network, it is possible to identify the latent structures in data. In other words, using the deep neural network, it is possible to identify the latent structures of an image, a text, a video, a voice, and music (for example, it is possible to determine what kind of object is present in an image, understand the content and emotion conveyed in a text, recognize the content and emotion expressed in a voice, and so on). The deep neural network may include a convolutional neural network, a recurrent neural network (RNN), an auto encoder, generative adversarial networks (GAN), a restricted Boltzmann machine (RBM), a deep belief network (DBN), a Q network, a U network, a Siam network, and the like. The description of the deep neural network described above is just an example and the present disclosure is not limited thereto.

In an embodiment of the present disclosure, the network function may include an auto encoder. The auto encoder may be a kind of neural network for outputting output data similar to input data. The auto encoder may include at least one hidden layer and odd hidden layers may be disposed between the input and output layers. The number of nodes in each layer may be expanded symmetrical to reduction in number of nodes from the input layer to an intermediate layer called a bottleneck layer (encoding), and then reduction from the bottleneck layer to the output layer (symmetrical to the input layer). In this case, in the example of FIG. 2, it is illustrated that the dimension reduction layer and the dimension reconstruction layer are symmetric, but the present disclosure is not limited thereto and the nodes of the dimension reduction layer and the dimension reconstruction layer may be symmetric or not. The auto encoder may perform non-linear dimensional reduction. The number of input and output layers may correspond to the number of sensors remaining after preprocessing the input data. The auto encoder structure may have a structure in which the number of nodes in the hidden layer included in the encoder decreases in a direction away from the input layer. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more). The neural network may be trained with at least one scheme of supervised learning, unsupervised learning, and semi supervised learning. Learning of the neural network is to reduce or minimize errors in output. The learning of the neural network is a process of repeatedly inputting training data into the neural network and calculating the output of the neural network for the training data and the error of a target and back-propagating the errors of the neural network from the output layer of the neural network toward the input layer in a direction to reduce the errors to update the weight of each node of the neural network. In the case of the supervised learning, the training data labeled with a correct answer is used for each training data (e.g., the labeled training data) and in the case of the unsupervised learning, the correct answer may not be labeled in each training data. That is, for example, the training data in the case of the supervised learning related to the data classification may be data in which category is labeled in each training data. The labeled training data is input to the neural network, and the error may be calculated by comparing the output (category) of the neural network with the label of the training data. In another example, in the case of the unsupervised learning related to the data classification, the training data as the input is compared with the output of the neural network to calculate the error. The calculated error is back-propagated in a reverse direction (e.g., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a later stage of the learning, thereby increasing accuracy.

In learning of the neural network, the training data may be generally a subset of actual data (e.g., data to be processed using the learned neural network) of actual data, and as a result, there may be a learning cycle in which errors for the training data decrease, but the errors for the actual data increase. Overfitting is a phenomenon in which the errors for the actual data increase due to excessive learning of the training data. For example, a phenomenon in which a neural network that learns a cat by showing a yellow cat does not recognize that the cats other than the yellow cat are the cats may be a kind of overfitting. The overfitting may act as a cause which increases the error of the machine learning algorithm. Various optimization methods may be used in order to prevent the overfitting. In order to prevent the overfitting, a method such as increasing the training data, regularization, dropout of omitting a part of the node of the network in the process of learning, etc., may be applied.

Figure 8:
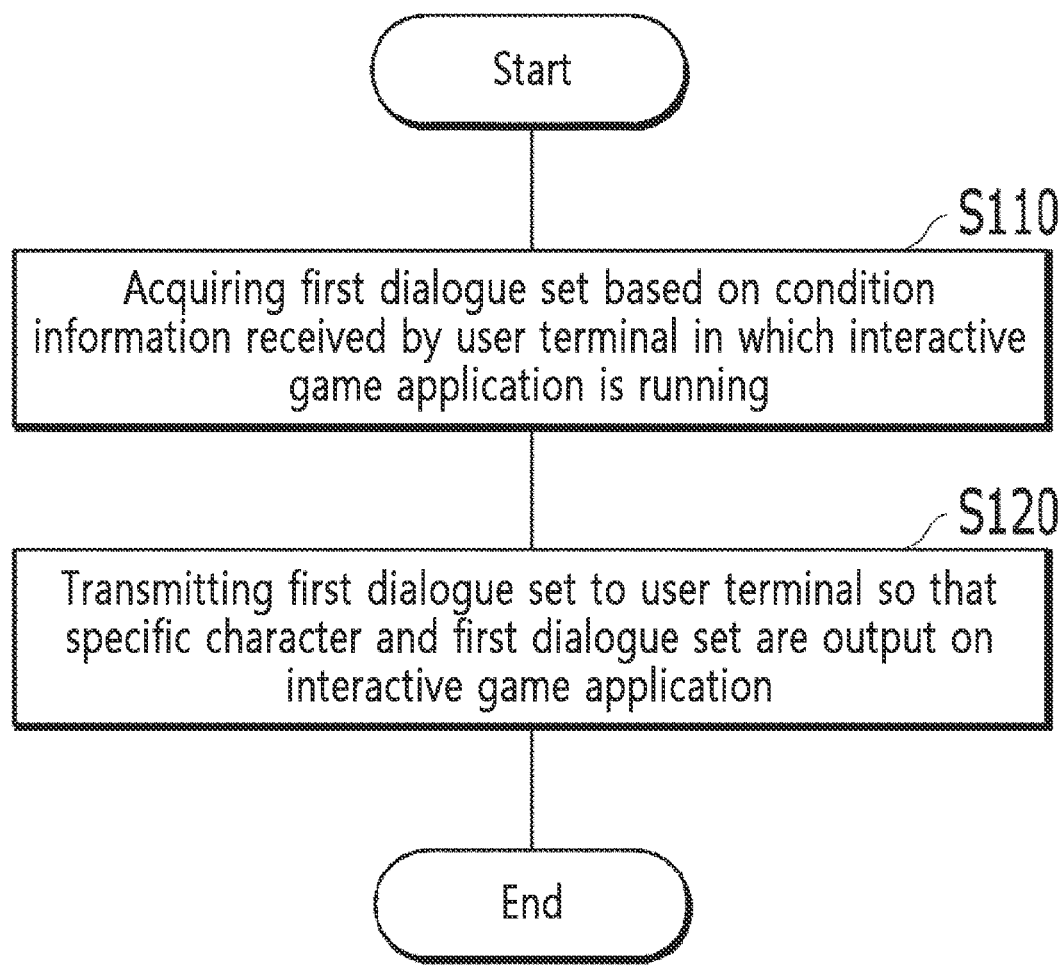
FIG. 8 is a flowchart for explaining an example of a method for a server to transmit a user-customized dialog set to a user terminal according to some embodiments of the present disclosure.

FIG. 8 is a flowchart for explaining an example of a method for a server to transmit a user-customized dialog set to a user terminal according to some embodiments of the present disclosure.

According to some embodiments of the present disclosure, a processor 110 of a server 100 may receive condition information from a user terminal 200 through a communication unit 120. Here, the condition information may be information for determining a dialog set related to lines of a character image. Also, the condition information may be received by the server 100 when an interactive game application is running on the user terminal 200. For example, the condition information includes at least one of the following: first condition information related to a time or date, second condition information related to a location (or movement) of the user terminal, and third condition information related to execution of the interactive game application. For a detailed example, the first condition information may include time information. The second condition information may include information on a current location. The third condition information may include information on a game access time. However, the present disclosure is not limited thereto.

The processor 110 of the server 100 may acquire a first dialogue set based on the condition information received from the user terminal 200 in operation S110. Here, the first dialogue set may refer to data generated based on condition information and log data generated upon previous execution of the interactive game application in the user terminal 200. However, the present disclosure is not limited thereto.

Specifically, using the condition information, the processor 110 may recognize whether a specific condition among a plurality of pre-set conditions is satisfied. When it is recognized that the specific condition is satisfied based on the condition information, the processor 110 may acquire a first dialogue set corresponding to the specific condition from among a plurality of dialogue sets pre-stored in the memory 130.

For example, when the condition information is first condition information related to a time or date, the processor 110 of the server 100 may recognize whether a specific condition related to a specific time or specific date is satisfied based on the first condition information. And, when it is recognized that the specific condition is satisfied, the processor 110 may acquire a first dialogue set related to the specific time or specific date. In this case, the first dialogue set may include sentences related to at least one of the specific time and the specific date. For example, the first dialogue set may include a sentence such as "Good morning!" related to the specific time. However, the present disclosure is not limited thereto.

In another example, when the condition information is the second condition information related to the location of the user terminal 200, the processor 110 of the server 100 may acquire location information of the user terminal 200 from the user terminal 200. Also, the processor 110 may recognize whether the user terminal 200 is moving based on the location information. Then, when it is recognized that the user terminal 200 is moving, the processor 110 may acquire a first dialogue set related to the location movement. In this case, the first dialogue set may include a sentence related to the location movement. For example, the first dialogue set may include a sentence such as "Are you walking?, How is the weather?" related to the location movement. However, the present disclosure is not limited thereto.

In yet another example, when the condition information is the second condition information related to a location of the user terminal 200, the processor 110 of the server 100 may acquire location information of the user terminal 200 from the user terminal 200. Also, based on the location information, the processor 110 may recognize whether a current location of the user terminal 200 coincides with a specific location included in log data. When it is recognized that the current location of the user terminal 200 coincides with a first location included in the log data or a second location pre-stored in the memory 130, the processor 110 may acquire a first dialogue set related to the first location or the second location. In this case, the first dialogue set may include a sentence related to the first location or the second location. For example, the first dialogue set may include a sentence such as "Are you looking at the sea?" related to a specific location. However, the present disclosure is not limited thereto.

In yet another example, when the condition information is the third condition information related to execution of the interactive game application, the processor 110 of the server 100 may recognize an account linked to the user terminal based on the third condition information. Also, the processor 110 may recognize log data of the account linked to the user terminal 200. Here, the log data of the account linked to the user terminal 200 may be stored in the memory 130 of the server 100.

Meanwhile, using the log data, the processor 110 may recognize whether a specific condition related to a game progress status is satisfied. Also, when the processor 110 recognizes that the specific condition related to the game progress status is satisfied, the processor 110 may acquire a first dialogue set corresponding to the game progress status. In this case, the first dialogue set may include a sentence related to the game progress status.

For example, the processor 110 may recognize the last access time using the log data of the account. In addition, the processor 110 may compare the last access time and the current time to recognize an out-of-access time. Further, when the out-of-access time is equal to or longer than a preset time, the processor 110 may recognize that the specific condition related to the game progress status is satisfied. In this case, the first dialogue set may include a sentence such as "It's been a while!". However, the present disclosure is not limited thereto.

In yet another example, the processor 110 may recognize the number of dialogues using the log data of the account. Further, when the number of dialogues is equal to or greater than a preset number, the processor 110 may recognize that the specific condition related to the game progress status is satisfied. In this case, the first dialogue set may include a sentence such as "Now, we've been closer." However, the present disclosure is not limited thereto.

Meanwhile, when the first dialogue set is acquired, the processor 110 may control the communication unit 120 to transmit the first dialogue set to the user terminal 200 in operation S120. In this case, the user terminal 200 having received the first dialogue set may output a specific character and the first dialogue set in the interactive game application.

As described above, the server 100 of the present disclosure may create a user-customized dialog set using a plurality of conditions stored in the memory 130 and log data of the interactive game. In addition, the server 100 may provide the customized dialogue set to an interactive game user.

Accordingly, the server 100 of the present disclosure may enhance the interactive game user's immersion by using customized dialogue set. In addition, the server 100 may increase entertainment elements for the user using the customized dialogue set.

Meanwhile, as described above in the description of FIG. 1, the user terminal 200 of the present disclosure may generate and provide a dialogue set of the interactive game.

Specifically, the processor 210 of the user terminal 200 may acquire the first dialogue set based on condition information acquired from the user terminal 200 in which the interactive game application is running. Also, the processor 210 may output a specific character and at least one message included in the first dialogue set in the interactive game application.

More specifically, when it is recognized that a condition related to condition information satisfies a specific condition among a plurality of preset conditions at a time of acquiring the first dialogue set, the processor 210 may acquire a first dialogue set corresponding to the specific condition among the plurality of dialogue sets pre-stored in the memory 230 of the user terminal 200.

Additionally, the processor 210 of the user terminal 200 may extract a specific keyword corresponding to each of the plurality of preset conditions from the log data. In this case, the processor 210 may generate a plurality of dialogue sets by inserting a specific keyword into a position where to insert a keyword in a sentence formed differently for each of the plurality of preset conditions.

That is, the entity performing the "method for generating and providing a dialogue set in an interactive game" of the present disclosure may be the server 100 or the user terminal 200.

Figure 9:
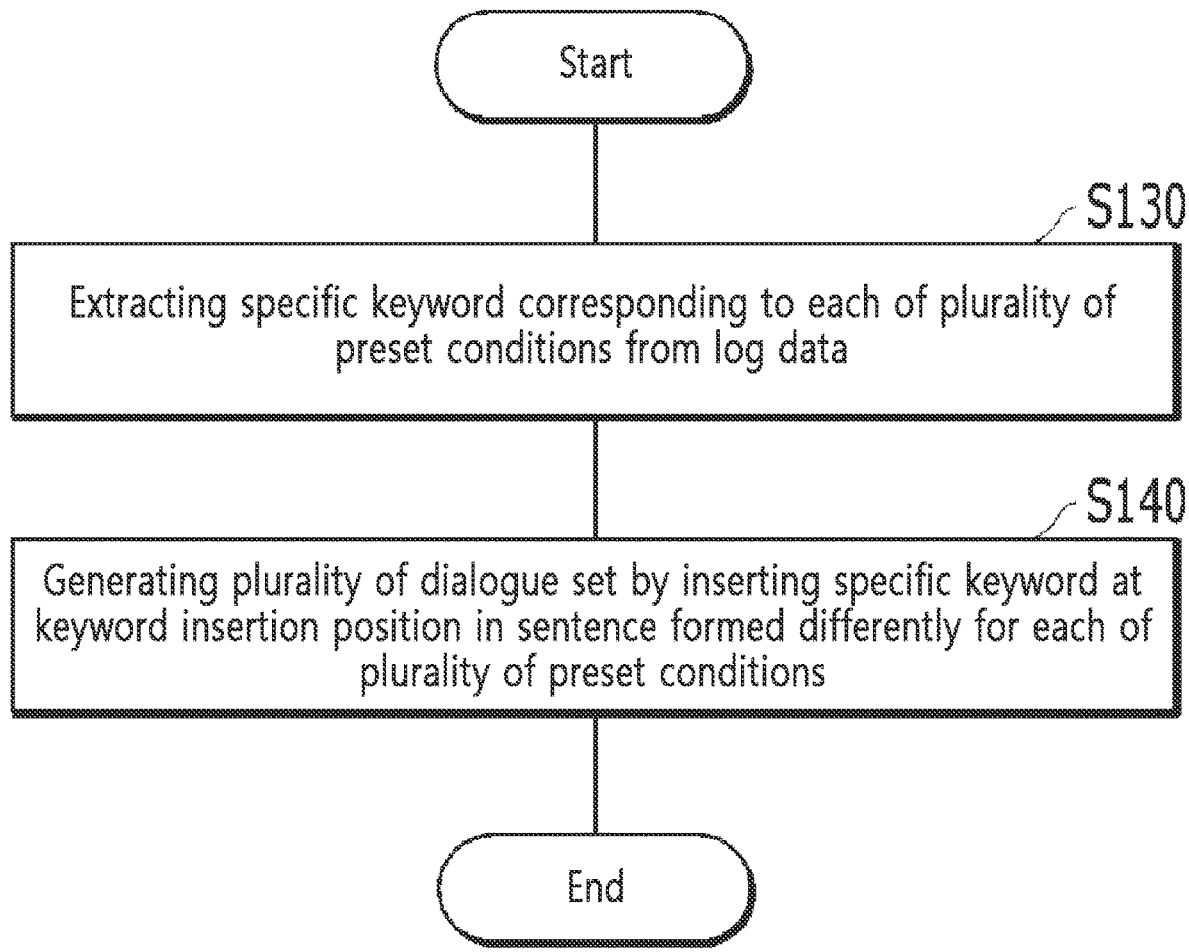
FIGS. 9 and 10 are flowcharts for explaining an example of a method for a server to generate a user-customized dialog set according to some embodiments of the present disclosure.
Figure 10:
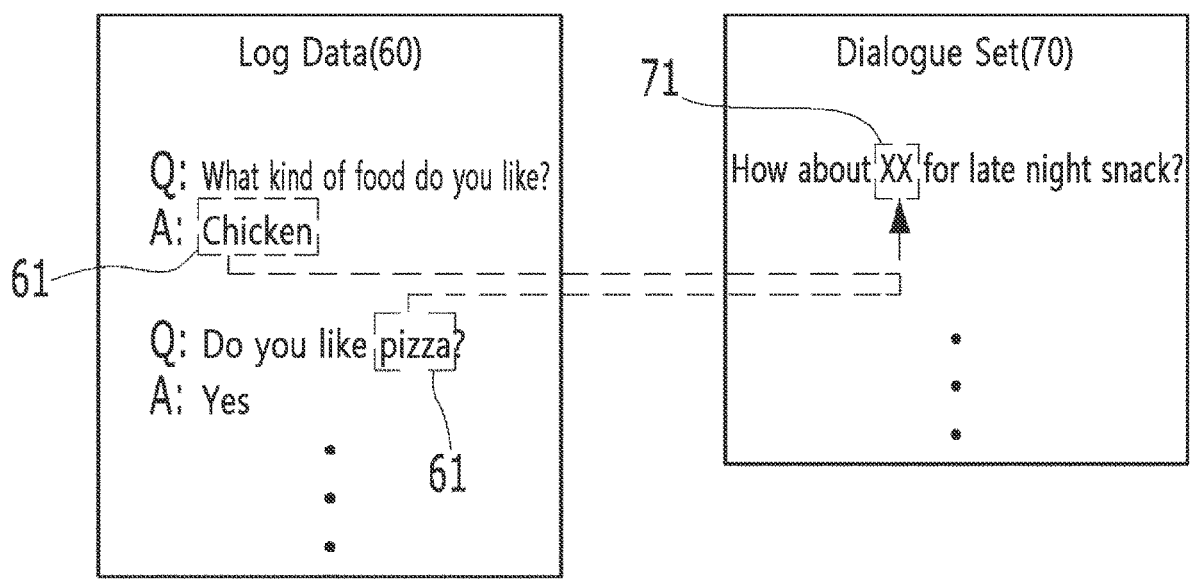

FIGS. 9 and 10 are flowcharts for explaining an example of a method for a server to generate a user-customized dialog set according to some embodiments of the present disclosure.

According to some embodiments of the present disclosure, by using log data generated upon previous execution of an interactive game application in a user terminal 200, the processor 110 of the server 100 may generate a user-customized dialog set related to the log data.

Specifically, referring to FIG. 9, the processor 110 of the server 100 may extract a specific keyword corresponding to each of a plurality of preset conditions from log data in operation S130. In addition, the processor 110 may generate a plurality of dialog sets by inserting the specific keyword into a position where to insert a keyword in a sentence formed differently for each of the plurality of preset conditions in operation S140.

For example, referring to FIG. 10, log data 60 may include a question "What kind of food do you like?" and an answer "Chicken". Also, the log data 60 may include a question "Do you like pizza?" and an answer of "Yes".

In addition, as a sentence formed according to a specific condition, there may be a sentence "How about XX for late night snack?". Here, a position 71 where to insert a keyword 71 may be XX.

In this case, the processor 110 of the server 100 may extract "Chicken" or "pizza" as a specific keyword 61 from the log data 60. In addition, the processor 110 may generate the dialogue set 70 by inserting the extracted keyword 61 in the position 71 where to insert a keyword in the sentence of "How about XX for late night snack?" formed according to a specific condition.

That is, the processor 110 of the server 100 may generate a dialogue set including a sentence of "How about chicken for late night snack?" or "How about pizza for late night snack?".

Accordingly, the server 100 of the present disclosure may increase the interactive game user's immersion by using the dialogue set generated based on the log data that is a record of the game played by the user. In addition, the server 100 may increase entertainment elements for the using the dialogue set generated based on the log data that is a record of the game played by the user.

Figure 11:
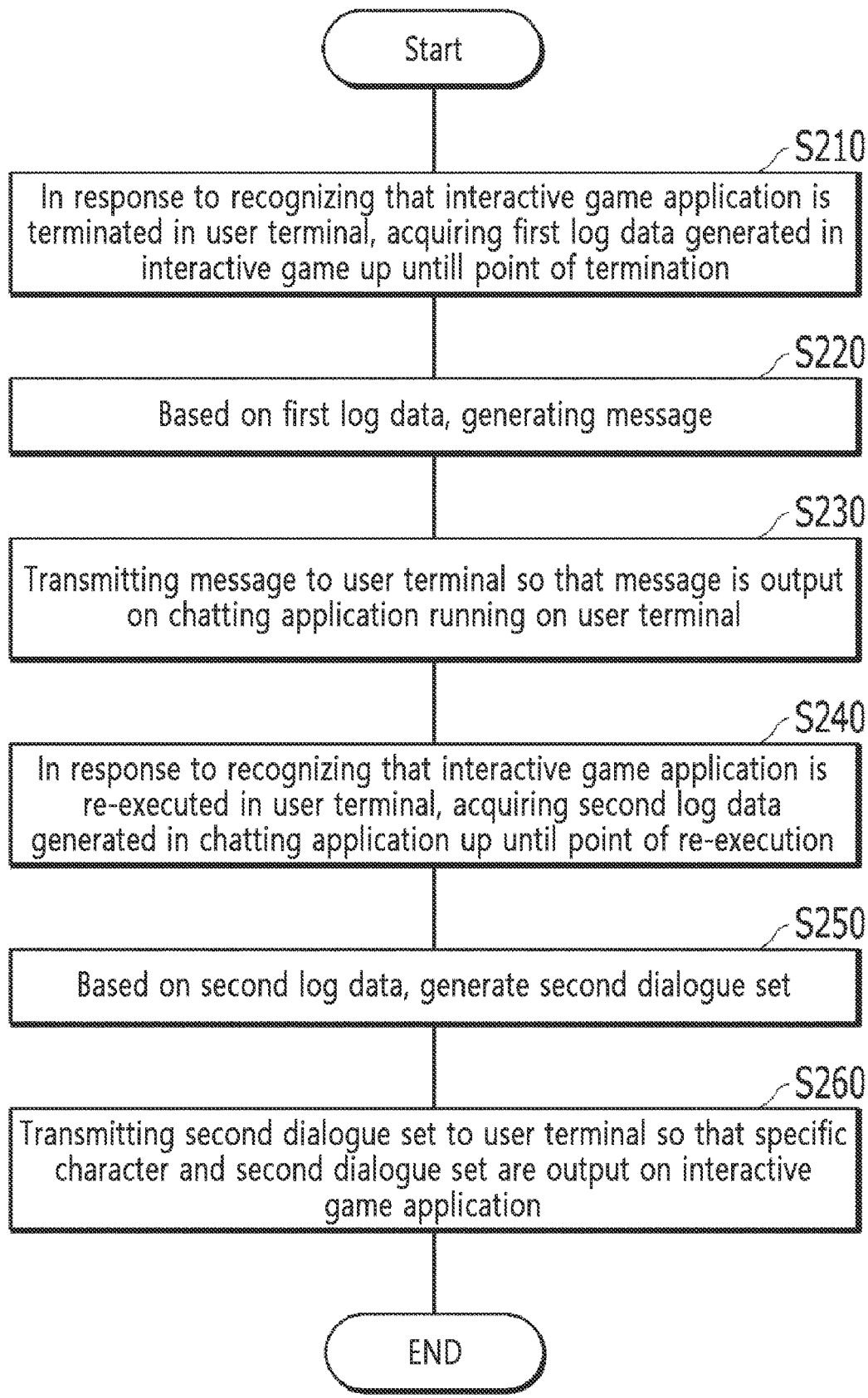
FIG. 11 is a flowchart illustrating an example of a method for a server to link an interactive game application and a chatting application according to some embodiments of the present disclosure.

FIG. 11 is a flowchart illustrating an example of a method for a server to link an interactive game application and a chatting application according to some embodiments of the present disclosure.

According to some embodiments of the present disclosure, a processor 110 of a server 100 may provide a user with an interactive game by linking the interactive game application and the chatting application.

Specifically, referring to FIG. 11, the processor 110 of the server 100 may recognize whether the interactive game application in a user terminal 200 is terminated. Meanwhile, when it is recognized that the interactive game application is terminated in the user terminal 200, the processor 110 may acquire first log data generated in the interactive game up until a point of termination in operation S210. Also, the processor 110 may generate a message based on the first log data in operation S220. Then, the processor 110 may control the communication unit 120 to transmit the message to the user terminal 200 in operation S230. In this case, the user terminal 200 may output the message on the chatting application.

In other words, even if an interactive game user terminates the interactive game after executing the interactive game application through the user terminal 200, the interactive game user is able to continue the conversation with a character image of the interactive game through the chatting application.

According to some embodiments of the present disclosure, the processor 110 of the server 100 may recognize whether the interactive game application is re-executed in the user terminal 200. Meanwhile, when the processor 110 recognizes that the interactive game application is re-executed in the user terminal 200, the processor 110 may acquire second log data generated in the chatting application up until a point of re-execution in operation S240. Also, the processor 110 may generate a second dialogue set based on the second log data. Then, the processor 110 may control the communication unit 120 to transmit the second dialogue set to the user terminal 200 in operation S260. In this case, the user terminal 200 may output a specific character and the second dialogue set in the interactive game application.

In other words, in the interactive game application, the interactive game user is able to continue conversation that has been made with a character image of the interactive game through the chatting application.

As described above, the server 100 of the present disclosure may provide a conversation feature with a character image of the interactive game in each of the interactive game application and the chatting application. In addition, the server 100 may provide a feature of continuous conversation by linking the interactive game application and the chatting application.

Accordingly, the server 100 of the present disclosure may enable continuous conversation between a character image of the interactive game and a user, thereby increasing the user's immersion.

In the following description, a method and embodiments for a processor of a computing device to perform the technical features of the present disclosure will be described. Here, the processor of the computing device may be the processor 110 of the server 100 or the processor 210 of the user terminal 200.

According to some embodiments of the present disclosure, a processor of a computing device (e.g., a user terminal) may output, on the chatting application, a first message generated through a character account corresponding to a character of an interactive game application.

For example, when it is recognized that the chatting application is terminated, the processor 110 of the server 100 may create the character account corresponding to the character of the interactive game application. When the character account is created, the processor 110 may generate the first message through the character account. In addition, the processor 110 may transmit the first message to the user terminal 200 so that the first message generated through the character account is output on the user terminal 200. In this case, the user terminal 200 may output the first message received from the server 100 on the chatting application.

In another example, when it is recognized that the chatting application is terminated, the processor 210 of the user terminal 200 may execute the interactive game application in the background to create the character account corresponding to the character of the interactive game application. When the character account is created, the processor 210 may generate a first message through the character account by using the interactive game application running on the background. Also, when the first message is generated, the processor 210 may output the first message on the chatting application.

Here, the character account may be created in the chatting application by the processor of the computing device when the user signs up for the interactive game. Also, when an event related to the character occurs in the game application, the character account may be added to a friend list of the user account in the chatting application.

For example, the character account is added to the friend list of the user account when a user exchanges numbers with a game character in the interactive game application (i.e., engaging in conversation related to number exchange during gameplay of the interactive game application). In another example, the character account may be added to the friend list of the user account when the user first encounters the game character in the interactive game application (i.e., when the character first appears on the interactive game application). However, the present disclosure is not limited thereto.

Additionally, when the character account is created in the chatting application, the character account may send a friend addition request to the user account. In addition, when the user account allows addition of a friend in response to the friend addition request, the character account may be added to the friend list of the user account.

According to some embodiments of the present disclosure, if the chatting application is executed after the interactive game application is terminated, the first message may be a message generated based on first log data that is generated in the interactive game application up until a point of termination of the interactive game application.

For example, when the server 100 generates the first message, the processor 110 of the server 100 may generate the first message using the first log data. Then, the processor 110 may transmit the first message to the user terminal 200 so that the first message is output on the chatting application installed in the user terminal 200. In this case, the user terminal 200 may output the first message received from the server 100 on the chatting application. That is, the first message of the present disclosure may be a message generated and received by an external server (here, the server 100) related to a game application. However, the present disclosure is not limited thereto.

In another example, when the user terminal 200 generates the first message, the processor 210 of the user terminal 200 may generate the first message using the first log data. Then, the processor 210 may output the first message on the chatting application.

Hereinafter, since a method for generating a dialogue set by a processor of a computing device using log data has been described in detail with reference to FIG. 8, a detailed description thereof will be omitted.

Additionally, when the chatting application is terminated and then the interactive game application is executed, a message generated based on at least one of a first message, a second message, and a reaction may be output on the interactive game application.

That is, in the interactive game application, the user may continue the conversation that has been made with a character of the interactive game through the chatting application. Accordingly, the computing device of the present disclosure may enable continuous conversation between the character of the interactive game and the user, thereby maintaining the user's level of immersion in the game.

According to some other embodiments of the present disclosure, when a specific condition among a plurality of preset conditions is satisfied, the first message may include a specific dialogue set corresponding to the specific condition.

For example, the processor 110 of the server 100 may receive condition information from the user terminal 200. The processor 110 may recognize whether a condition included in the received condition information satisfies a specific condition among the plurality of preset conditions. When the specific condition among the plurality of preset conditions is satisfied, the processor 110 may recognize the specific dialogue set corresponding to the specific condition. The processor 110 may transmit a first message including the specific dialogue set to the user terminal 200. In this case, the user terminal 200 may output the first message received from the server 100 on the chatting application. That is, the first message of the present disclosure may be a message generated and received by an external server (here, the server 100) related to a game application. However, the present disclosure is not limited thereto.

In another example, the processor 210 of the user terminal 200 may recognize condition information of the user terminal 200. Using the condition information, the processor 210 may recognize whether a specific condition among a plurality of preset conditions is satisfied. Then, when the specific condition among the plurality of preset conditions is satisfied, the processor 210 may output, on the chatting application, a first message including the specific dialogue set corresponding to the specific condition.

Hereinafter, since a method for generating a dialog set by a processor of a computing device using condition information has been described in detail with reference to FIG. 8, a detailed description thereof will be omitted.

According to some other embodiments of the present disclosure, a first message may be a message generated through an interactive game application running on the background when a chatting application is running.

For example, when an interactive game application is executed in the user terminal 200 under the control of the server 100, the processor 110 of the server 100 may transmit the first message to the user terminal 200 through the interactive game application. In this case, the user terminal 200 may output on the chatting application the first message acquired through the interactive game application. That is, the first message of the present disclosure may be a message that is generated by an external server related to an interactive game application and then transmitted to the user terminal 200. However, the present disclosure is not limited thereto.

In another example, when the interactive game application is itself executed in the user terminal 200, the processor 210 of the user terminal 200 may acquire the first message from the interactive game application. Then, the processor 210 may output on the chatting application the first message acquired from the interactive game application.

According to some embodiments of the present disclosure, when a second message is acquired in response to a first message from a user account corresponding to a user playing an interactive game on a chatting application, a processor of a computing device (e.g., a user terminal) may perform a reaction determined on the basis of the second message.

Here, the second message may be output on the chatting application together with information indicating whether the character has seen the second message.

And, the reaction may include at least one of the following: a first reaction of outputting a response message to the second message; a second reaction expressing that the character has not seen the second message through information indicating whether or not the message is seen, without outputting a response message; or a third reaction expressing that the character has seen the second message through information indicating whether the message is seen, without outputting a response message. Here, the chatting application may be an application that provides a read confirmation function that informs whether or not the chatting partner has read a message.

Specifically, the reaction may be determined on the basis of whether a first keyword having a positive meaning mapped to the first message or a second keyword having a negative meaning mapped to the first message is included in the second message.

For example, the processor 110 of the server 100 may receive the second message from the user terminal 200. The processor 110 may recognize whether at least one of the first keyword or the second keyword is included in the second message. The processor 110 may determine a reaction based on whether at least one of the first keyword or the second keyword is included. Then, the processor 110 may transmit a reaction control signal to the user terminal 200 so that the user terminal 200 performs the determined reaction.

In another example, the processor 210 of the user terminal 200 may acquire the second message from the chatting application. The processor 210 may determine a reaction based on whether at least one of the first keyword or the second keyword is included in the second message.

For example, when the first keyword is included in the second message, the processor 210 of the user terminal 200 may determine a reaction to the second message as a first reaction. Meanwhile, when both the first keyword and the second keyword are included in the second message, the processor 210 may determine a reaction to the second message as a second reaction. On the other hand, when the second keyword is included in the second message, the processor 210 may determine a reaction to the second message as a third reaction. However, the present disclosure is not limited thereto.

Therefore, unlike existing chatbots that unconditionally send responses to messages, whether to reply or read confirmation may be determined on the basis of a message sent by a user, so that the user may feel like exchanging messages with a real person.

As described above, when an interactive game user is having a conversation with a character of an interactive game through a chatting application, a computing device of the present disclosure may provide the user with a feature of conversation similar to interaction with a real person. Accordingly, the computing device may increase the user's immersion in the interactive game.

According to some embodiments of the present disclosure, when the first reaction is performed in the user terminal 200, a response message may be output after an elapse of a preset time from a time when the second message is acquired or a time when the second message is displayed as having been read.

Here, the preset time may be a time determined on the basis of the number of texts constituting the response message. However, the present disclosure is not limited thereto, and a time preset by an administrator may be pre-stored in the memory of the computing device.

For example, the processor 110 of the server 100 may generate a response message and determine a waiting time using the number of texts constituting the response message. Then, the processor 110 may transmit the response message and information on the waiting time to the user terminal 200. In this case, the user terminal 200 may output the response message after an elapse of the waiting time.

In another example, the processor 110 of the server 100 may generate a response message and determine a waiting time using the number of texts constituting the response message. Then, the processor 110 may transmit the response message to the user terminal 200 after an elapse of the waiting time determined using the number of texts from a time of receipt of the second message. In this case, the user terminal 200 may output the response message after an elapse of the waiting time.

In another example, after generating a response message, the processor 210 of the user terminal 200 may determine a waiting time corresponding to the number of texts constituting the response message. Then, the processor 210 may output the response message after an elapse of the waiting time.

As described above, when an interactive game user is having a conversation with a character of an interactive game through a chatting application, ae computing device of the present disclosure may provide a feature of conversation similar to interaction with a real person (specifically, providing a feeling as if a person types a response message). Accordingly, the computing device may increase the user's immersion in the interactive game.

Therefore, unlike in existing chatbots that respond immediately to messages sent by users and receive replies, a user sends a message and receive a reply after an elapse of a preset time, and thus, the user may feel as if receiving the reply from a real person.

Figure 12:
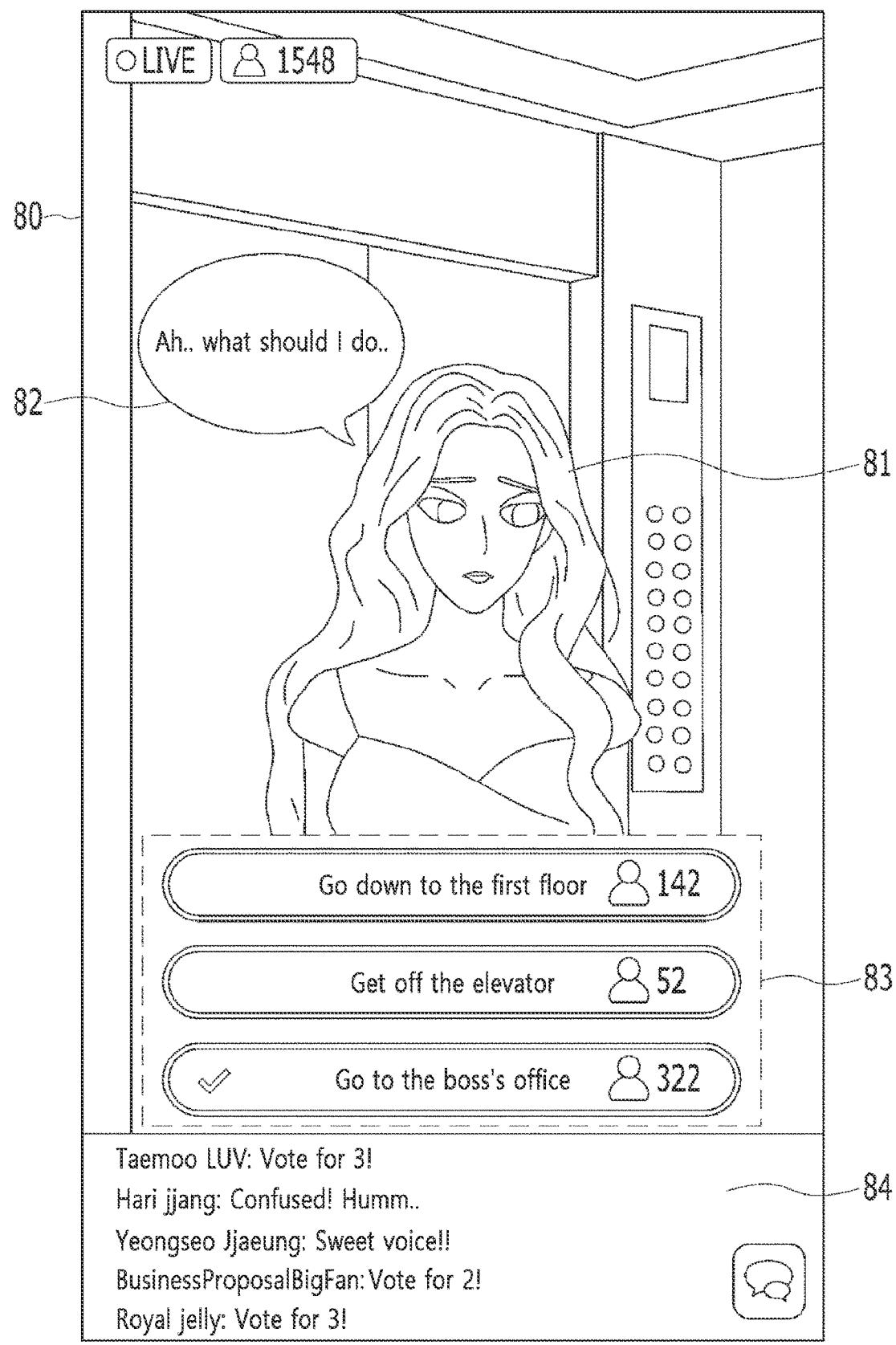
FIG. 12 is a flowchart illustrating an example of a method for a server to provide an interactive game in a real-time broadcasting platform according to some additional embodiments of the present disclosure.

FIG. 12 is a flowchart illustrating an example of a method for a server to provide an interactive game in a real-time broadcasting platform according to some additional embodiments of the present disclosure.

According to some additional embodiments of the present disclosure, the processor 110 of the server 100 may provide an interactive game in a real-time broadcasting platform. That is, the real-time broadcasting platform and the interactive game application may be linked.

Specifically, referring to FIG. 12, the processor 110 of the server 100 may transmit a game screen 80 to the real-time broadcasting platform server so that a game screen running on the interactive game application is broadcast on the real-time broadcasting platform.

Here, the game screen 80 may include a character image 81, a first speech bubble 82, at least one selection button 83, and a chatting window 84. Here, the at least one selection button 83 may be a button for selecting a response to a text included in the first speech bubble 82. However, the aforementioned components are not essential to construct the user game screen 80, and thus the game screen 80 may have more or fewer components than those listed above.

According to some embodiments of the present disclosure, after transmitting the aforementioned game screen 80 to the real-time broadcasting platform server, the processor 110 of the server 100 may receive a response signal to select any of at least one selection button 83 from the real-time broadcasting platform server. Here, the response signal received from the real-time broadcasting platform server may include information on a most frequently selected response among the response signals received from other user terminals participating in the real-time broadcasting. In addition, the response signal may include responses acquired from a plurality of users through the chatting window 84 provided on the game screen 80. However, the present disclosure is not limited thereto.

Meanwhile, based on the response signal the processor 110 of the server 100 may determine a next game screen to be transmitted after the game screen 80. Then, the processor 110 may control the communication unit 120 to transmit the next game screen to the real-time broadcasting platform server.

According to some additional embodiments of the present disclosure, the server 100 may provide a real-time broadcasting platform of its own to a plurality of users. That is, the processor 110 of the server 100 of the present disclosure may transmit the game screen 80 to each of a plurality of user terminals, without transmitting and receiving separate data to and from the real-time broadcasting platform server as described above. Also, the processor 110 may receive a response signal from each of a plurality of user terminals. Also, the processor 110 may determine the next game screen based on the response signal. Then, the processor 110 may control the communication unit 120 to transmit the determined next game screen to each of the plurality of user terminals.

As described above, the server 100 of the present disclosure may provide an interactive game in which the plurality of users can participate. In addition, the server 100 may provide a chatting feature between the plurality of users.

Accordingly, the server 100 of the present disclosure may increase entertainment elements for each of the plurality of users through the chatting function. In addition, the server 100 may facilitate promotion and use of interactive games through real-time broadcasting.

Figure 13:
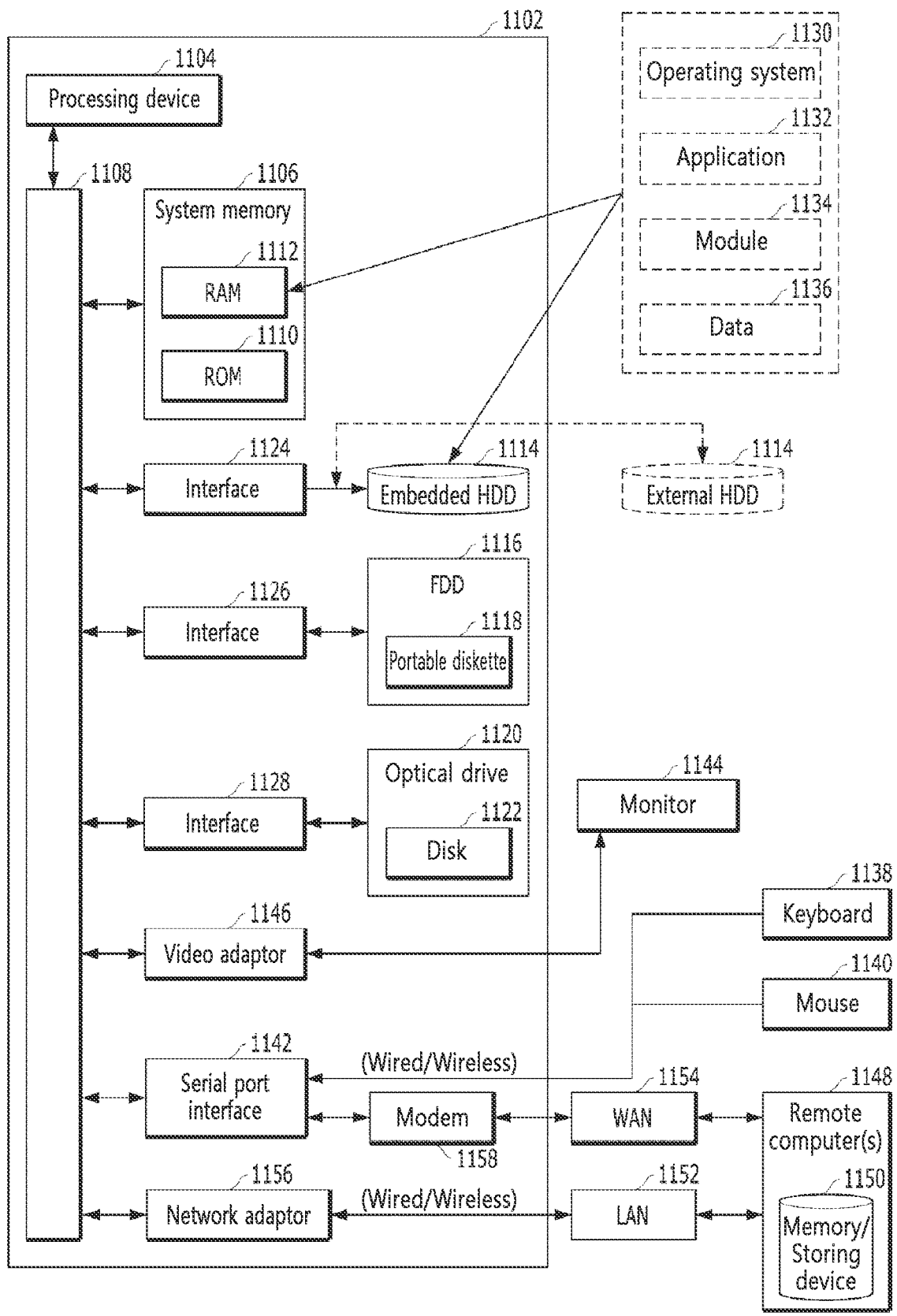
FIG. 13 illustrates a brief and general schematic diagram of an exemplary computing environment in which embodiments of the present disclosure may be implemented.

FIG. 13 illustrates a brief and general schematic diagram of an exemplary computing environment in which embodiments of the present disclosure may be implemented.

Generally, even though the present disclosure is described in regard to a computer executable instruction which can be executable on one or more computers, it is obvious to those skilled in the art that the present disclosure may be implemented by being coupled with other program modules and/or a combination of hardware and software.

Generally, the program module includes a routine, a program, a component, a data structure, or the like which performs a specific task or implements a specific abstract data type. Further, those skilled in the art may understand that the method of the present disclosure may be embodied not only by a single processor or a multi-processor computer system, a mini computer, and a main frame computer, but also a personal computer, a hand-held computing apparatus, microprocessor based or programmable home appliances (which may be connected to one or more related devices to be operated), and other computer system configurations.

The described exemplary embodiments of the present disclosure may also be embodied in a distributed computing environment in which some tasks are performed by remote processing devices which are connected to each other through a communication network. In the distributed computing environment, a program module may be located in both local and remote memory storing devices.

Generally, a computer includes various computer readable media. Any of media accessible by a computer may be computer readable media. The computer readable medium includes volatile and non-volatile media, transitory and non-transitory media, and mobile and non-mobile media. As an example which is not limitation, the computer readable medium may include a computer readable storage medium and a computer readable transmission medium.

The computer readable storage medium includes a volatile or non-volatile medium, a transitory or non-transitory medium, and a mobile or a non-mobile medium which are implemented by an arbitrary method or technique which stores information such as a computer readable instruction, a data structure, a program module or other data. The computer storage medium includes a RAM, a ROM, an EEPROM, a flash memory, or other memory techniques, a CD-ROM, a digital video disk (DVD), or other optical disk storing devices, a magnetic cassette, a magnetic tape, a magnetic disk storing device, or other magnetic storing devices, or other arbitrary media which are accessed by a computer and are used to store desired information, but is not limited thereto.

The computer readable transmission medium generally implements a computer readable instruction, a data structure, a program module, or other data in a modulated data signal such as a carrier waver or other transport mechanism and includes all information transfer medium. A term "modulated data signal" refers to a signal in which one or more properties of the signal are set or changed to encode information in the signal. As an example which is not limitation, a computer readable transmission medium includes a wired medium such as a wired network or direct wired connection and a wireless medium such as sound, RF, infrared ray, or other wireless medium. It is considered that a combination of any of the above-mentioned media may also be included in the scope of the computer readable transmission medium.

An exemplary environment 1100 including a computer 1102 which implements various aspects of the present disclosure is illustrated and the computer 1102 includes a processing device 1104, a system memory 1106, and a system bus 1108. The system bus 1108 connects system components including a system memory 1106 (not to be limited thereto) to the processing device 1104. The processing device 1104 may be an arbitrary processor among various commercial processors. A dual processor and other multiprocessor architectures may also be used as the processing device 1104.

The system bus 1108 may be any of several types of bus structures which is additionally connected to a local bus which uses any of a memory bus, a peripheral device bus, and various commercial bus architectures. The system memory 1106 includes a read only memory (ROM) 1110 and a random access memory (RAM) 1112. A basic input/output system (BIOS) is stored in a non-volatile memory 1110 such as a ROM, an EPROM, and an EEPROM and the BIOS includes a basic routine which assists to transmit information between components in the computer 1102 while the computer is activated. The RAM 1112 may further include a fast RAM such as a static RAM for caching data.

The computer 1102 further includes an embedded hard disk drive (HDD) 1114 (for example, EIDE, SATA) which may also be configured as an external drive in an appropriate chassis (not illustrated), a magnetic floppy disk drive (FDD) 1116 (for example, to read data from a portable diskette 1118 or record data therein), and an optical disk driver 1120 (for example, to read a CD-ROM disk 1122 or read data from other high quantity optical medium such as a DVD or record data therein). The hard disk drive 1114, the magnetic disk drive 1116, the optical disk drive 1120 may be connected to the system bus 1108 through a hard disk drive interface 1124, a magnetic disk drive interface 1126, and an optical drive interface 1128. The interface 1124 for implementing an external drive includes at least one or both of universal serial bus (USB) and IEEE 1394 interface technique.

These drives and a computer readable medium related therewith provide non-volatile storage of data, a data structure, a computer executable instruction, or the like. In the case of the computer 1102, the drive and the medium correspond to storing arbitrary data as an appropriate digital type. In the description of the computer readable medium, an HDD, a portable magnetic disk, and a portable optical medium such as a CD or a DVD have been mentioned, but, it is well known to those skilled in the art that other types of computer readable media such as a zip drive, a magnetic cassette, a flash memory card, a cartridge, or the like may also be used in an exemplary operating environment and the arbitrary medium may include a computer executable instruction which performs the methods of the present disclosure.

A large number of program modules including an operating system 1130, one or more application programs 1132, other program module 1134, and program data 1136 may be stored in the drive and the RAM 1112. The operating system, the application, the module and/or all or a part of data are also cached by the RAM 1112. It is obvious that the present disclosure may be implemented by various commercially applicable operating systems or a combination of operating systems.

A user may input a command and information to the computer 1102 through one or more wired/wireless input devices, for example, a pointing device such as a keyboard 1138 and a mouse 1140. Other input device (not illustrated) may include a microphone, an IR remote controller, a joystick, a game pad, a stylus pen, a touch screen, or the like. These and other input devices are sometimes connected to the processing device 1104 through an input device interface 1142 which is connected to the system bus 1108, but may be connected by a parallel port, an IEEE 1394 serial port, a game port, a USB port, an IR interface, or other interfaces.

A monitor 1144 or other type of display device is also connected to the system bus 1108 through an interface such as a video adaptor 1146. In addition to the monitor 1144, a computer generally includes other peripheral output devices (not illustrated) such as a speaker or a printer.

The computer 1102 may operate in a networked environment using logical connection of remote computer(s) 1148 to one or more remote computers through wired and/or wireless communication. The remote computer(s) 1148 may be a workstation, a computing device computer, a router, a personal computer, a portable computer, a microprocessor based amusement machine, a peer device, or other general network node and generally, includes a large number of or all the components which have been described for the computer 1102, but However, for the purpose of simplicity, only a memory storing device 1150 is illustrated. The illustrated logical connection includes wired/wireless connection to a local area network (LAN) 1152 and/or larger network, for example, a wide area network (WAN) 1154. The LAN and WAN networking environments are general in an office and a company and facilitate enterprise-wide computer network such as Intranet and these are all connected to a worldwide computer network, for example, Internet.

When the computer 1102 is used in the LAN networking environment, the computer 1102 is connected to a local network 1152 through a wired and/or wireless communication network interface or an adaptor 1156. The adaptor 1156 allows wired or wireless communication to the LAN 1152 and the LAN 1152 also includes a wireless access point provided therein to communicate with the wireless adaptor 1156. When the computer 1102 is used in the WAN networking environment, the computer 1102 has other means, for example, includes a modem 1158 or is connected to a communication computing device on the WAN 1154, or uses Internet to set communication through the WAN 1154. The modem 1158 which may be an embedded or external, and wired or wireless device is connected to the system bus 1108 through the serial port interface 1142. In a networked environment, program modules described for the computer 1102 or a part thereof may be stored in the remote memory/storing device 1150. It is understood that the illustrated network connection is an example and other means to set a communication link between computers may be used.

The computer 1102 performs operations to communicate with an arbitrary wireless device or entity which is disposed through wireless communication to operate, for example, a printer, a scanner, a desktop and/or portable computer, a portable data assistant (PDA), a communication satellite, arbitrary equipment or location related with a wireless detectable tag, and a telephone. This includes at least Wi-FI and Bluetooth wireless technology. Therefore, communication may be a previously defined structure such as a network of the related art or simply ad hoc communication between at least two devices.

Wi-Fi (wireless fidelity) may allow connection to the Internet without using a wire. The Wi-Fi is a wireless technique such as a cell phone which allows such a device, for example, a computer to transmit and receive data indoor and outdoor, that is, in any place within a coverage of a base station. The Wi-Fi network uses a wireless technology called IEEE 802.11 (a, b, g, or the like) to provide safe, reliable, and fast wireless connection. Wi-Fi may be used to connect computers to each other or to the Internet, and a wired network (IEEE 802.3 or Ethernet is used). The Wi-Fi network operates, for example, at a 11 Mbps (802.11a) or 54 Mbps (802.11b) data rate in an unauthorized wireless band of 2.4 and 5 GHz or operates in a product including both bands (dual band).

Those skilled in the art may understand that various exemplary logical blocks, modules, processors, units, circuits, and algorithm steps which have been described with respect to the exemplary embodiments disclosed herein may be implemented by electronic hardware, various types of programs (for the convenience, referred to as "software" here), a design code, or a combination thereof. In order to clearly describe compatibility of hardware and software, various exemplary components, blocks, modules, circuits, and steps are generally described above with respect to functions thereof. Whether these functions are implemented as hardware or software is determined depending on design restrictions which are applied to a specific application and the entire system. Those skilled in the art may implement the function, which is described by various methods, of the specific application but the implementation determination is not interpreted to depart from the scope of the present disclosure.

Various exemplary embodiments suggested herein may be implemented by a method, a device, or a standard programming and/or an article using an engineering technique. A term "article" includes a computer program which is accessible from an arbitrary computer readable device, a carrier or a media. For example, the computer readable medium includes a magnetic storing device (for example, a hard disk, a floppy disk, or a magnetic strip), an optical disk (for example, a CD or a DVD), a smart card, and a flash memory device (for example, an EEPROM, a card, a stick, or a key drive), but is not limited thereto. The term "machine-readable media" include a wireless channel and various other media that can store, possess, and/or transfer command(s) and/or data, but are not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. The accompanying method claims provide elements of various steps in the order of sample, but the claims are not meant to be limited to the suggested specific order or hierarchical structure.

Description of the suggested exemplary embodiment is provided to allow those skilled in the art to use or embody the present disclosure. Various modifications to these embodiments may be apparent to those skilled in the art, and generic principles defined herein may be applied to other embodiments without departing from the scope of the present disclosure. Therefore, the present disclosure is not limited to the exemplary embodiments suggested herein, but interpreted in the broadest range which is consistent with principles suggested herein and new features.

The present disclosure may be used in game applications, devices, systems, and the like.

What is claimed is:

1. A method for providing an interactive game by a processor and a memory of a computing device connected via a communication network to an interactive game application and a chatting application, the method comprising:

storing, in the memory, a first log data generated by the interactive game application during interaction between a user account and a character of the interactive game application;

upon termination of the interactive game application, maintaining, by the processor, synchronization between the interactive game application and the chatting application by storing the first log data in association with the character;

in response to determining that the interactive game application has been terminated, generating, by the processor, a first message based on the first log data and a character account corresponding to the character;

displaying the first message in the chatting application; and when a second message is received, via the chatting application from the user account in response to the first message, performing, by the processor, a reaction determined according to the first log data and the content of the second message, wherein the character account is added to a friend list of the user account on the chatting application based on conversation history information between the user account and the character stored in the memory.

2. The method of claim 1, wherein the second message is output on the chatting application, along with information indicating whether the character has seen the second message, and the reaction comprises at least one of the following:

a first reaction of outputting a response message to the second message;

a second reaction expressing that the character has not seen the second message, without outputting a response message; or a third reaction expressing that the character has seen the second message, without outputting a response message.

3. The method of claim 2, wherein when the first reaction is performed, the response message is output after an elapse of a preset time from a time when the second message is acquired or a time when the second message is displayed as having been read.

4. The method of claim 3, wherein the preset time is a time determined on the basis of a number of texts constituting the response message.

5. The method of claim 1, wherein the first message comprises a specific dialogue set corresponding to a specific condition when the specific condition among a plurality of preset conditions is satisfied.

6. The method of claim 1, wherein the first message is a message generated through an interactive game application running on a background when the chatting application is running.

7. The method of claim 1, wherein the first message is a message generated and received by an external server related to the interactive game application.

8. The interactive game of claim 1, wherein the reaction is a reaction determined on the basis of whether at least one of a first keyword having a positive meaning or a second keyword having a negative meaning is included in the second message.

9. The method of claim 1, further comprising:

outputting on the interactive game application a message generated at least one of the first message, the second message, or the reaction, in a case where the chatting application is terminated and the interactive game application is executed.

10. A non-transitory computer readable recording medium storing instructions, when executed by one or more processors, configured to perform the method of claim 1.

\* \* \* \* \*